(12) United States Patent
Soloway

(10) Patent No.: US 9,785,903 B2
(45) Date of Patent: *Oct. 10, 2017

(54) METADATA-CONFIGURABLE SYSTEMS AND METHODS FOR NETWORK SERVICES

(71) Applicant: Versaic Inc., San Mateo, CA (US)

(72) Inventor: Mark Grant Soloway, Orinda, CA (US)

(73) Assignee: Versaic Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,194

(22) Filed: Mar. 2, 2016

(65) Prior Publication Data

US 2016/0180267 A1 Jun. 23, 2016

Related U.S. Application Data

(63) Continuation of application No. 14/573,999, filed on Dec. 17, 2014, now Pat. No. 9,299,047, which is a
(Continued)

(51) Int. Cl.
*G06F 15/16* (2006.01)
*G06Q 10/06* (2012.01)
(Continued)

(52) U.S. Cl.
CPC ... *G06Q 10/0637* (2013.01); *G06F 17/30292* (2013.01); *G06Q 10/06* (2013.01);
(Continued)

(58) Field of Classification Search
None
See application file for complete search history.

(56) References Cited

U.S. PATENT DOCUMENTS

| 6,643,652 B2 | 11/2003 | Helgeson et al. |
| 6,721,747 B2 | 4/2004 | Lipkin |

(Continued)

OTHER PUBLICATIONS

Search Report and Written Opinion mailed Mar. 21, 2011 from International Serial No. PCT/US2011/021918 filed Jan. 20, 2011.

*Primary Examiner* — Tejis Daya
(74) *Attorney, Agent, or Firm* — Sheppard, Mullin, Richter & Hampton LLP

(57) ABSTRACT

In some embodiments, the presentation manager is configured to provide an interface requesting information regarding a proposal from a digital device over a network and receive the information from the digital device. The business object manager is configured to instantiate a business object based on the received information and store the instantiated business object within a data structure residing in a computer readable medium. The business rule manager is configured to generate a business rule associated with the business object, the business rule comprising instructions to perform an operation, the instructions being conditional based on the instantiated business object. The metadata manager is configured to generate metadata associated with the instantiated business object, store the generated metadata in the computer readable medium, perform the operation based on the business rule and the generated metadata, and instruct the presentation manager to provide a second interface indicating a status of the proposal.

32 Claims, 19 Drawing Sheets

Related U.S. Application Data continuation of application No. 13/009,811, filed on Jan. 19, 2011, now Pat. No. 8,949,317.

(60) Provisional application No. 61/296,892, filed on Jan. 21, 2010.

(51) Int. Cl.
*G06F 17/30* (2006.01)
*H04L 29/06* (2006.01)
*H04L 29/08* (2006.01)

(52) U.S. Cl.
CPC ......... *G06Q 10/0633* (2013.01); *H04L 67/16* (2013.01); *H04L 67/42* (2013.01)

(56) References Cited

U.S. PATENT DOCUMENTS

| | | |
|---|---|---|
| 6,775,658 B1 * | 8/2004 | Zothner ............... G06Q 10/087 705/28 |
| 7,340,406 B1 | 3/2008 | Tribble |
| 7,415,484 B1 | 8/2008 | Tulkoff et al. |
| 7,603,381 B2 | 10/2009 | Burke et al. |
| 2002/0116293 A1 | 8/2002 | Lao et al. |
| 2003/0229529 A1 | 12/2003 | Mui et al. |
| 2004/0117358 A1 | 6/2004 | von Kaenel et al. |
| 2004/0224674 A1 | 11/2004 | O'Farrell et al. |
| 2005/0038764 A1 | 2/2005 | Minsky et al. |
| 2011/0004830 A1 | 1/2011 | Von Kaenel et al. |

* cited by examiner

FIG. 6

DR PEPPER SNAPPLE

Home　　Proposal Manager　　My Account　　Help　　Contact Us　　Logout

Select Your Template

Philanthropy
☐ Marketing Sponsorships
　　Sports Marketing
　　Sports and Entertainment (Non-Sports)
　　Music
　　Individual/Endorsements (Athletes, Celebrities, etc.)
Cause Related Partnership
Venue Pouring Rights DPS is committed to taking action to improve our communities through ACTION Nation, our corporate philanthropy pr Our mission through this program is to foster physically active, engaged and sustainable communities where we oper channeling our volunteer and giving efforts on four areas:

- Fit and active lifestyles
- Environmental initiatives
- Emergency relief
- Community celebrations By focusing our philanthropy against these focus areas, we believe we can make real difference in our communities As DPS awards most donations to pre-identified nonprofit organizations that are well aligned with our focus areas an business principles, we have limited funding for unsolicited requests. DPS does not consider funding the following as our philanthropic outreach:

1. Organizations that do not have 501(c)(3) status
2. Requests from organizations outside the communities where DPS operates
3. Requests outside of Canada, the Caribbean, Mexico or the United States
4. Individuals
5. Annual or capital campaigns and endowment funds
6. Conferences or seminars
7. Donations for religious or political purposes
8. United Way agencies, except for special initiatives not already funded through local campaigns
9. Private foundations
10. Courtesy advertising (e.g., yearbooks, school programs)

If your request fits the above giving guidelines, please proceed. Your request must be submitted at least 30 business advance of your activity so consider this when applying.

Preview Financial Donation Questions　　　　　　　　　　　　　　Preview Product Donation Questions ( Financial Donation )　　　　　　　　　　　　　　　　　　　　( Product Donation )

FIG. 9

Preliminary Questions

If you have any questions, please e-mail us at support@versaic.com

*Is your organization a qualified non-profit or public tax-exempt organization as defined under Section 501(c)(3) of the Internal Revenue Service ○ Yes  ● No ( Cancel )    ( << Back )    ( Continue >> )

FIG. 10

Preliminary Questions

Thank you for thinking of DPS. We award philanthropic donation to qualified charities organized under IRS Code Section 501(c)(3). Without an IRS Determination Letter, your organization not eligible for a donation. Again, thank you for thinking of DPS. Should you receive an IRS qualification under IRS Code Section 501(c)(3), please reapply.

( Cancel )    ( << Back )

FIG. 11A

Preliminary Questions

If you have any questions, please e-mail us at support@versaic.com

*Is your request National or Local in scope?

○ National – Select National if your request will take place or be used in multiple states.
● Local – Select Local if your request will take place or be used in one community or state.

( Cancel )    ( << Back )    ( Continue >> )

FIG. 11B

Select Local DPS Site

Please select the nearest DPS site from the list below.

Snapple Distributor's Incorporated
212 Wolcott Street
Brooklyn, New York, 11231

Selected DPS Site

Snapple Distributor's Incorporated
212 Wolcott Street
Brooklyn, New York, 11231

FIG. 13

*Major Audience Demographic
From the list of age specific demographics below, please select the group that your event/request specifically targets (75% or more geared towards this group, generally)

--- not selected ---
None, or Unsure
Age 1-5 (Mothers with children in this age range)
Age 8-12 (Mothers with children in this age range)
Age 16-22
Age 18-24
Age 18-34
Age 18-49
Age 21-45
Age 25-40
Age 31-39
Age 35-44
Age 50+

* Is your organization a 501c3 nonprofit agency registered with the IRS?

⦿ Yes  ○ No

* Tax ID number

Must be a valid TaxID number (XX-XXXXXXX)

| 13-1234567 |

The TaxID that was entered has 501 status

☐ I Don't Know

Mailboxes  My Proposals  Reports  Search

User: client, Client role  My Account  Logout

Dr Pepper Snapple Group

> Filter

Archive  Add to Decline Q...  Labels...  More Actions...  Export...

| | Mailbox | Proposed Name | Organization State/Province | Main Date | Template Type | Status | Received | VIP | Reason | Labels |
|---|---|---|---|---|---|---|---|---|---|---|
| ☐ | National Philanthropy | Organization X | Colorado | 3/26/2011 | Financial Donation | Approved | 1/19/2011 | Andy Cummings | Andy Cummings | |
| ☐ | DPS Agents | Test | Illinois | 11/23/2010 | Employee Request | Under Consideration | 11/24/2010 | | | |
| ☐ | DPS Agents | Test! | Georgia | 11/22/2010 | Employee Request | Under Consideration | 11/24/2010 | | Andy Cummings | |
| ☐ | National Philanthropy | Another Test Organization | Oregon | 1/1/2011 | Financial Donation | Approved | 11/23/2010 | HF1 | | |
| ☐ | ELT VIP Mailbox | Made Up Name PTA | Florida | 12/29/2010 | Financial Donation | Under Consideration | 11/23/2010 | PAP | | |
| ☐ | Nashville | Financial Donation Organization | Tennessee | 12/25/2010 | Financial Donation | Under Consideration | 11/23/2010 | | | |
| ☐ | Canada | Music Canada Test | Ontario | 1/25/2011 | Music | Under Consideration | 11/22/2010 | | | |
| ☐ | Snapple | Event $100,000 - $249,990 Test | Louisiana | 12/12/2010 | Event and Entertainment (Non-Sports) | Declined Auto | 11/22/2010 | | System Action | |
| ☐ | Dr Pepper | Cause Local Test | Ohio | 12/3/2010 | Cause Related Partnership | Declined Auto | 11/22/2010 | | System Action | |
| ☐ | Venom | Music Local Test | Ohio | 12/5/2010 | Music | Declined Auto | 11/22/2010 | | System Action | |

< Prev 1 2 3 4 5 ... 34 Next >  Page: [1] (Go)  [10 ▲] items on page        1 of 34 (331 items)

Mailbox
- Local Requests
  - Alabama
    - Birmingham (Bessemer)
    - Mobile
  - Arkansas
    - Bentonville (Sales)
    - Springdale
  - California
    - Bakersfield
    - Camarito
    - Castroville Status Filter
- ☐ Approved
- ☐ Declined Auto
- ☐ Declined Manually
- ☐ In Decline Queue
- ☐ Under Consideration
- ☐ VIP (Filter)

Label Filter
- ☐ All Labels
- ☐ ◇ Favorite

FIG. 18

DR PEPPER SNAPPLE

Mailboxes | My Proposals | Reports | Search

Reports >> Template/Mailbox Stats

User: client, Client role | My Account

Reports
- Cash Donated by Focus
- Philanthropy Organization
- Amount Donated by Type
- Template/Mailbox Stats Received From [1/1/2010]  Received To [11/21/2010]

Select a format [Export]   View R

DR PEPPER SNAPPLE

Template/Mailbox Stats

| Type | Mailbox | Total Approved | Total Declined | Total Under Consideration | To Req |
|---|---|---|---|---|---|
| Cause Related Partnership | Local | 1 | 9 | 1 | |
| | Sponsorship | 0 | 1 | 0 | |
| | Total | 1 | 10 | 1 | |
| Event and Entertainment (Non-Sports) | Local | 0 | 18 | 35 | |
| | Outside USA | 0 | 5 | 0 | |
| | Sponsorship | 0 | 4 | 2 | |
| | Total | 0 | 27 | 37 | |
| Financial Donation | Local | 1 | 36 | 5 | |
| | National Philanthropy | 0 | 10 | 0 | |

FIG. 19

Custom Reports

Reports
- Custom Reports
  - DPSG Quarterly Grant Report
  - Proposal statistics
  - Mailbox Statistics
  - Budget Statistics
- Sponsorships
  - Sport Category
  - Entertainment
- Donations
  - Monetary - Organization Focus Select a format  Export

| Month\Budget Group | Human Resources | Marketing | Community Relations | Corporate | Communications | Consumer Affairs | Total |
|---|---|---|---|---|---|---|---|
| February 2009 | $12345 | | | | | | $12345 |
| March 2009 | | $40000 | $45000 | | | | $85000 |
| May 209 | | $35000 | | | | | $35000 |
| June 2009 | | | | $15000 | $34000 | | $49000 |
| August 2009 | | $10000 | | $35000 | | $17000 | $62000 |
| October 2009 | | | $5000 | | $24000 | | $29000 |
| March 2010 | $1000 | $6900 | $550 | | | | $8450 |
| Total | $13345 | $91900 | $50550 | $50000 | $58000 | $17000 | $280795 |

FIG. 20

METADATA-CONFIGURABLE SYSTEMS AND METHODS FOR NETWORK SERVICES

CROSS-REFERENCE TO RELATED APPLICATION

This application is a continuation of U.S. patent application Ser. No. 14/573,999, filed Dec. 17, 2014, entitled "Metadata-Configurable Systems and Methods for Network Services," which is a continuation of U.S. patent application Ser. No. 13/009,811, filed Jan. 19, 2011, entitled "Metadata-Configurable Systems and Methods for Network Services," which claims priority to U.S. Provisional Patent Application Ser. No. 61/296,892, filed Jan. 21, 2010, and entitled "System of Metadata Configurable Web-Based Software for Collection and Management of Inbound Communications," which are hereby incorporated by reference herein.

BACKGROUND

1. Field of the Invention

The present invention generally relates to metadata systems. More particularly, the invention relates to metadata-configurable systems and methods for network services.

2. Description of Related Art

Traditional software systems are typically created for a dedicated purpose with limited optional behaviors and features. Major feature and behavior changes to traditional software systems require significant development efforts and the creation of new versions. Systems that are created to be flexible require extensive custom development work to meet custom requirements.

Over the last 15 years, large software systems have evolved to allow for the creation and modification of major feature and behavior changes through configuration. By and large, these software systems are client/server, desktop/server, or mainframe applications that are installed on-premises in a data center or IT facility.

Web-based software systems and applications, however, are replacing the on-premises software system. The main attributes of web-based software systems are that the software is accessible via a web browser anywhere the Internet. Server portions are hosted in a data center managed by (or on the behalf of) a provider of the software system.

There are generally two forms of web-based software systems:

Web-based software systems where the server part of the system is on a computer system dedicated to the users of a single entity (such as corporations and institutions). Software systems provided in this manner are called "managed service provider" systems or MSP systems.

Web-based software systems where the server part of the system is on systems that may be shared by users of many different entities (such as corporations and institutions). Software systems provided in this manner are currently called "software as a service" systems ("SaaS systems") and may function as "application service provider" systems ("ASP systems").

Since MSP systems provide a separate server installation for every entity using the software system, it is generally similar to an on-premises software system with respect to architecture. To provide an upgrade, both on-premises systems and MSP systems require a process for releasing new software for every entity using the software system. Since a SaaS system is sharing a server across multiple entities using the software system, when a SaaS system is updated, everyone using the SaaS system gets the benefit of the update. A SaaS system, however, is traditionally not as configurable as an on-premises software system.

SUMMARY OF THE INVENTION

Metadata-configurable systems and methods for network services are disclosed. In some embodiments, a system comprises a presentation manager, a business object manager, a business rule manager, and a metadata manager. The presentation manager may be configured to provide an interface requesting information regarding a proposal from a digital device over a network and to receive the information from the digital device. The business object manager may be configured to instantiate a business object based on the received information and to store the instantiated business object within a data structure residing in a computer readable medium. The business rule manager may be configured to generate a business rule associated with the business object, the business rule comprising instructions to perform an operation, the instructions being conditional based on the instantiated business object. The metadata manager may be configured to generate metadata associated with the instantiated business object, to store the generated metadata in the computer readable medium, to perform the operation based on the business rule and the generated metadata, and to instruct the presentation manager to provide a second interface to the digital device indicating a status of the proposal.

The business rule manager may generate the business rule before the presentation manager provides the interface requesting information regarding the proposal from the digital device over the network. The metadata manager configured to instruct the presentation manager to provide the second interface to the digital device indicating the status of the proposal may comprise the metadata manger configured to instruct the presentation manager to provide the second interface to request additional information. Further, the business object manager may be further configured to instantiate another business object based on the additional information and the metadata manager may be further configured to generate other metadata associated with the other instantiated business object, to perform another operation based on the other business rule and the other metadata, and to instruct the presentation manager to provide a third interface to the digital device indicating another status of the proposal.

The metadata manager may be further configured to contact a second digital device to receive approval of the proposal based on another business rule generated by the business rule manager and the metadata. In some embodiments, the metadata manager may be configured to instruct the presentation manager to provide the second interface to the digital device indicating the status of the proposal comprises the second interface displaying a message that the proposal is denied, accepted, or pending.

The presentation manager may be further configured to generate a second interface requesting information to create a report regarding the proposal and receiving proposal information to create the report. Further, the business object manager may be further configured to query the data structure based on the received information to create the report and retrieve proposal information. The metadata manager may also be further configured to direct the presentation manager to generate a third interface and create the report associated with the proposal information. The report may depict a summary of the status of the proposal as well as other information regarding other reports that may have been retrieved by the query of the business object manager. Moreover, the business object manager may be further configured to find the business object using a conditional query and query contents of the business object found or specified. Those skilled in the art will appreciate that the business object manager may use a conditional query to find or specify any number of business objects. Similarly, those skilled in the art will appreciate that the business object manager may query the content of any number or business objects found or specified.

The data structure may be a relational database.

In some embodiments, a method comprises providing an interface requesting information regarding a proposal from a digital device over a network, receiving the information from the digital device, instantiating a business object based on the received information, storing the instantiated business object within a data structure residing in a computer readable medium, generating a business rule associated with the business object, the business rule comprising instructions to perform an operation, the instructions being conditional based on the instantiated business object, generating metadata associated with the instantiated business object, storing the generated metadata in the computer readable medium, performing the operation based on the business rule and the generated metadata, and providing a second interface to the digital device indicating a status of the proposal.

In various embodiments, a computer readable medium may comprise executable instructions. The executable instructions may be executable by a processor to perform a method. The method may comprise providing an interface requesting information regarding a proposal from a digital device over a network, receiving the information from the digital device, instantiating a business object based on the received information, storing the instantiated business object within a data structure residing in a computer readable medium, generating a business rule associated with the business object, the business rule comprising instructions to perform an operation, the instructions being conditional based on the instantiated business object, generating metadata associated with the instantiated business object, storing the generated metadata in the computer readable medium, performing the operation based on the business rule and the generated metadata, and providing a second interface to the digital device indicating a status of the proposal.

BRIEF DESCRIPTION OF THE DRAWINGS

FIG. 6 is an exemplary screen shot of a report viewing user interface in some embodiments.

FIG. 9 is an exemplary screen shot of a template selection interface in some embodiments.

FIG. 10 is an exemplary screen shot of a preliminary questions interface in some embodiments.

FIG. 11A is an exemplary screen shot of a response to an answer in a preliminary questions interface in some embodiments.

FIG. 11B is another exemplary screen shot of a response to an answer in a preliminary questions interface in some embodiments.

FIG. 13 is an exemplary screen shot for determining a local client site in some embodiments.

FIG. 16 is an exemplary screen shot of tax information interface in some embodiments.

FIG. 17 is an exemplary screen shot of a proposal list interface in some embodiments.

FIG. 18 is an exemplary screen shot of a proposal summary interface in some embodiments.

FIG. 19 is an exemplary screen shot of a proposal summary report interface in some embodiments.

FIG. 20 is an exemplary screen shot of a custom report interface in some embodiments.

DETAILED DESCRIPTION OF THE INVENTION

In general, systems and methods described herein may allow for collection and management of information as well as the processes for routing, reviewing, making decisions about, automatically responding to, fulfilling, and reporting about inbound communications. For example, a metadata configurable web-based software system may be configured to collect data, manage data, present data, provide interactive page-flow, and provide work-flow for collection and management of and automated response to inbound communications.

In various embodiments, systems and methods described herein may perform the following functions, including but not limited to:

- arbitrarily complex data collection as described by metadata definitions for user interface, page-flow, and business objects;
- arbitrarily complex hierarchical information storage, retrieval, and manipulation using a relational database system as described by business object metadata definitions;
- arbitrarily complex user interface layout and presentation as described by user interface metadata definitions; and/or
- arbitrarily complex actions, services, processes, and work-flow as described by business process metadata definitions.

Systems and methods described herein may track changes and updates to metadata so that the specific versions and changes of metadata on any deployment of the system and/or functions may be identified and effects of upgrades and installations of new metadata can be understood. In one example, tracked changes and updates allow for installation of base versions of metadata configuration information, allow for changes to be made to different deployments of that metadata, and provide a framework for understanding the effects of the changes on each deployment. In some embodiments, different services associated with different metadata may be provided for different clients. Similarly, different updates and modifications may be provided based on individual client needs. These changes may be tracked and used to understand the effects of the changes. In some embodiments, reports may be generated to create ad-hoc chart data reports using business object information.

In various embodiments, the metadata language may be XML. Those skilled in the art will appreciate that in various embodiments there are many different languages (e.g., JSON, SOX, or YAML) that may be used to specify metadata.

In various embodiments, systems and methods described herein may include, but not be limited to, a highly configurable SaaS that does not have the configurability constraints of a traditional SaaS. In addition to being embodied as a SaaS, systems and methods described herein may be embodied as an on-premises system and as an MSP system.

Figure 1:
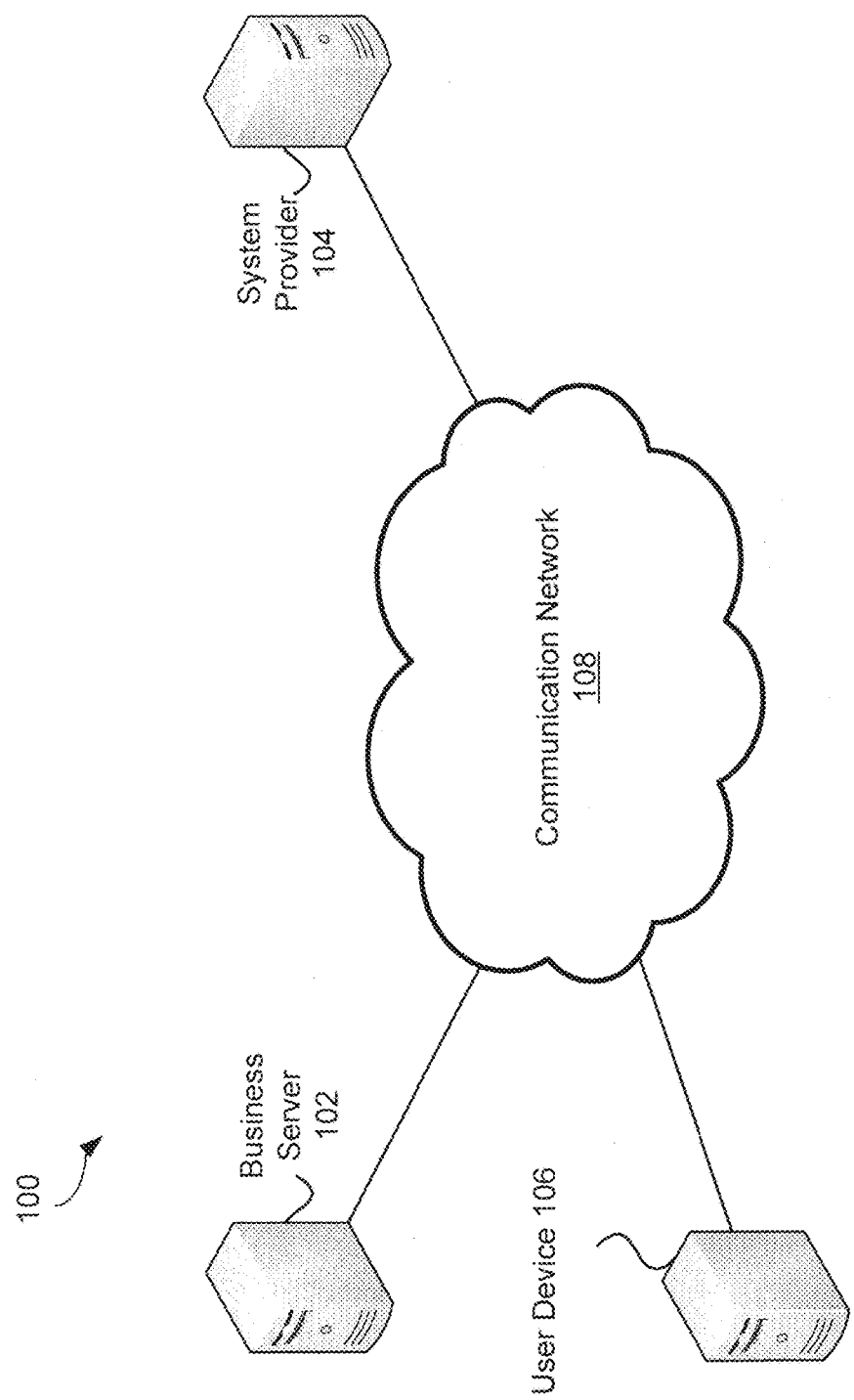
FIG. 1 is a diagram of an environment in which embodiments of the present invention may be practiced.

FIG. 1 is a diagram of an environment 100 in which embodiments of the present invention may be practiced. The environment 100 comprises a business server 102, a system provider 104, and a user device 106 in communication over a communication network 108. The business server 102, system provider 104, and the user device 106 may be digital devices or systems comprising one or more digital devices. A digital device is any device that has a processor and memory. Examples of digital devices include, but is not limited to, a computer, system, laptop, digital phone, smart phone (e.g., iPhone or M1), netbook, personal digital assistants, cable box, digital recorder (e.g., Tivo DVR), game console (e.g., Xbox), or the like. Digital devices are further discussed with regard to FIG. 21.

In various embodiments, a user may interact with services provided by the system provider 104. The services may include providing the user with a variety of interfaces (e.g., graphical user interfaces such as web pages). The user may provide information within the interfaces and, after submission of the information, the services may generate another interface, request additional information, and/or make determinations based on rules and the provided information. For example, the user may utilize the interface to make a submission for a proposal or grant. A first interface may request information such as the type of request, identification information, and tax code. Once submitted, the services may provide an additional interface based in part on the responses from the consumer. Alternately or additionally, the services may process the information from the consumer and make determinations on the proposal (e.g., deny, accept, request approval from others, and/or update status chart regarding all proposals received.)

The services may be metadata-based. For example, metadata that describes objects including responses from a user may be received, scanned, and/or stored within a relational database. Metadata rules may be applied to provide content, request additional information, perform authentication, or any other service based on some or all data provided by the user. Those skilled in the art will appreciate that, in some embodiments, the metadata system may allow for a highly configurable system without requiring access to underlying software code.

A business server 102 is a digital device that may provide, control, and/or allow others to host services that send and receive information over the communication network 108. In some examples, the business server 102 is a corporation which allows a user of user device 108 to interact with services over the communication network 108. The services may include, but not be limited to, an application, web page, interactivity, interface, or the like. In one example, the user may access an application via the user device 106 to provide information or submit a proposal. Those skilled in the art will appreciate that the services may perform any number of functions and may interact with one or more other services that are inaccessible to the user and/or provided by other digital devices. Although business server 102 is referenced as a "business" for purposes of description in FIG. 1, those skilled in the art will appreciate that the business server 102 may be any digital device regardless of the nature of the entity. For example, the "business" may be a person (e.g., a philanthropic individual), nonprofit corporation, organization, community, club, association, committee, board of directors, or any other entity or group of entities.

A system provider 104 is a digital device that provides and/or allows access to one or more services, web-based applications, databases, and/or systems. In various embodiments, a client associated with the business server 102 may enter into an agreement with a representative associated with the system provider 104 to provide one or more services. For example, the system provider 104 may provide software as a server (i.e., SaaS or sometimes referred to as "software on demand"). In various embodiments, one or more applications or support for applications (e.g., metadata and storage) may be hosted by the system provider 104 on behalf of the business server 102. Subsequently, the user of the user device 106 may interact with the one or more applications on the system provider 104. In some embodiments, the system provider 104 may distribute one or more applications, web-based applications, databases, and/or systems to the business server 102. Subsequently, the user of the user device 106 may interact with the one or more applications on the business server 102.

In one example, a provider associated with the system provider 104 may license services (e.g., one or more applications) to a client (i.e., associated with business server 102) and/or a user (i.e., associated with the user device 106) as a service on demand, through a subscription, in a "pay-as-you-go" model, or at no charge.

The user device 106 is any digital device which allows a user to interact with services hosted by and/or provided by the system provider 104. In some embodiments, the user device 106 is any digital device with a web browser or other application that allows the user to send and/or receive information over the communication network 108.

The communication network 108 is any network that is allows different digital devices to communicate. In some examples, the communication network 108 may comprise a LAN and/or WAN. Further the communication network 108 may comprise any number of networks. In some embodiments, the communication network 108 is the Internet.

Those skilled in the art will appreciate that code for services such as an application may be "in the cloud" thereby allowing a user to interact with the application via the communication network 108. In some embodiments, one or more components of the application code may be stored within RAM and/or longer term memory within the business server 102, the system provider 104, and/or the user device 106.

Although only a single business server 102, system provider 104, user device 106, and communication network 108 are depicted in FIG. 1, those skilled in the art will appreciate that there may be any number of business servers 102, system providers 104, user devices 106, and communication networks 108.

Those skilled in the art will appreciate that different versions, modifications, and/or updates of applications, web-based applications, databases, and/or systems may be distributed or hosted by the system provider 104 for different business servers 102.

Figure 2:
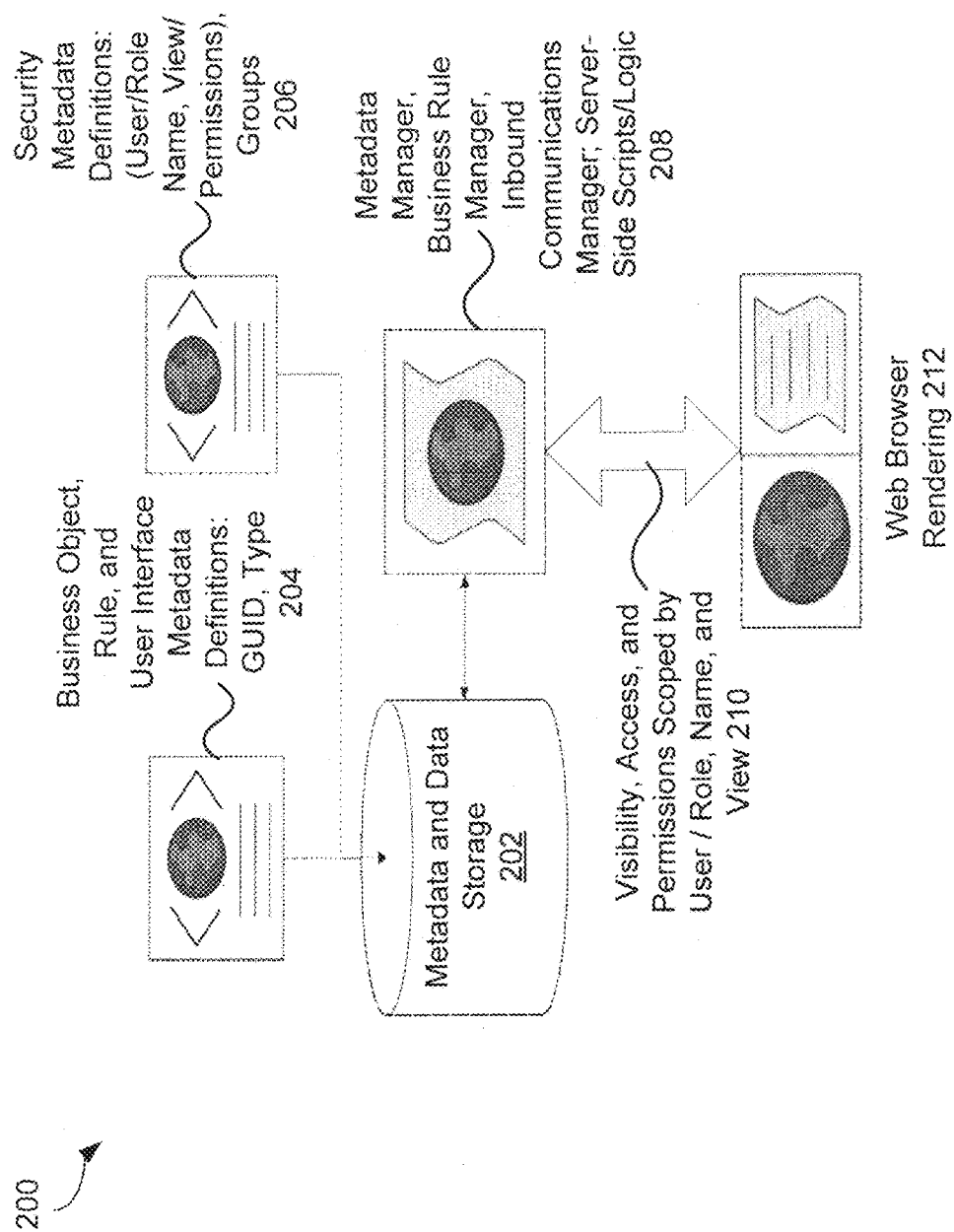
FIG. 2 is an exemplary conceptual diagram of the relationships between metadata, server processes, and a user web browser in some embodiments.

FIG. 2 is an exemplary conceptual diagram 200 of the relationships between metadata, server processes, and a user web browser in some embodiments. Metadata is data conveying information about data. In one example, metadata may describe a format, name, size, mode of acquisition, field types, title, subject, and author.

In various embodiments of systems and methods described herein, metadata may comprise definitions associated with data. Those skilled in the art will appreciate that metadata may be conceptually divided in any number of ways. For convenience, metadata definitions may be described as relating to a business object, rule, and user interface metadata definitions 204 as well as used to control security and/or functionality 206. For example, metadata, such as a Global Unique Identifier (GUID) or type (see metadata definitions 204), may describe or define a business object, a rule, or a user interface. Metadata may also describe or define a user or role, a name, view, permissions, or groups (see metadata definitions 206).

In various embodiments, a metadata and data storage 202 may store business object and user interface definitions: GUID, Type 204 as well as security metadata definitions: (user/role name, view/permissions), groups 206. The metadata and data storage 202 may also store data that is associated with the metadata. The storage may be any storage. In one example, the storage is a hard drive, solid state drive, or any other computer readable medium. Those skilled in the art will appreciate that the metadata and data storage 202 may include any number of storage devices. The storage devices may be within or in communication with any number of digital devices. In one example, the metadata and data storage 202 may be in communication with and/or within the business server 102 and/or the system provider 104. Metadata definitions may be in XML. Those skilled in the art will appreciate that the metadata definitions may be in any language and/or in any format.

In various embodiments, a metadata manager, business rule manager, inbound communications manager; server-side scripts/logic 208 may read the metadata definitions, create, and/or provide one or more data structures, such as database tables, that can be used to store, read, write, and/or query data objects described by the metadata. When the metadata definitions are modified and pushed to the metadata and data storage 202, the data structures may be updated. As a result, an application execution layer may read the new definitions and manifest new behavior and information models without changes to code.

In various embodiments, at least some metadata definitions have a global unique identifier of the definition (hereinafter referred to as a GUID), a platform version, an internal version, an external version, a type, a name, a view, an instance identifier, attribute, and/or field. The GUID is a global unique identifier of the definition. In some embodiments, the GUID will not change for a metadata definition. Those skilled in the art will appreciate that, in some embodiments, metadata definitions may have an identifier that is not necessarily unique or not necessarily globally unique.

A platform version is a version identifier associated with releases of an application development platform. For example, the platform version for a first release may be "1." The platform version may allow tracking of a specific release (e.g., tracking of a specific release in possession of a customer). Further, the platform version may allow for identification and tracking of base metadata definitions (e.g., before or between changes to the definitions). The version of the platform may be independent of the version of the application or what the customers may see with respect to version information.

An internal version is a version identifier that may be changed (e.g., increased) when a metadata definition is modified (e.g., as part of a sub-release of the application development platform). For example, a sub-release of an application development platform may be due to a bug fix, an enhancement, or a new service within the platform. In some embodiments, a sub-release may not be considered a new version of the platform. The internal version may allow for tracking released changes that may be minor, but can affect base definitions. In one example, released changes in reference applications or reference metadata may change the internal version.

An external version is a version identifier that may be changed (e.g., increased) whenever a customer, $3^{rd}$ party, professional services, or engineering on behalf of a specific customer modifies a metadata definition. In one example, the external version may be used to track customizations for a specific customer.

A metadata type may be the type of object or entity defined by the metadata definition.

A name is a mechanism that may allow for providing different access and permission specifications for different objects from the same metadata type. In some embodiments, the name, type, and the view (described herein), provide a specification of a metadata definition of a particular type that has a specific view, permission, and/or role specification (e.g., security features). In one example, the specification of a metadata definition may specify access, permission, security, and visibility for the metadata definition as well as the metadata and data associated with the definition. The name may be referred to as a user or role name.

Different document security levels may be defined with a document metadata type that defines attributes and behaviors of a document and an associated name. The document security levels may include, for example ClassifiedDocument, PrivateDocument, and PublicDocument. All three of these metadata definition names may be for metadata of type Document, but have different permissions associated with them.

A view may specify access, permission, security, and visibility information for the metadata. The view may also specify data associated with the definition. In some embodiments, the view may be a detailed access control list for access and visibility. The view may be associated with authorization metadata specifications discussed herein.

An instance identifier (e.g., instance ID) is an identifier of an instance of an object created from a metadata definition. The ID may be unique with respect to the metadata definition GUID, but may not necessarily be globally unique. In some embodiments, the metadata definition GUID and the instance ID may be globally unique when used together.

Attributes may specify functional uses, behavior, and use properties of the objects that the metadata defines. In one example, metadata may comprise an attribute that specifies document and media objects as part of the object the metadata defines. The metadata definition and the data management defined by the metadata may comprise the following functions with respect to the document/media object:

Attachment of multiple versions of the document/media object

Removal of any version or all versions of the document/media object

Viewing of supported document/media object types

For types where it is possible, invocation of an editor for the supported document/media object types with the following abilities:

Save and replace

Save and version

The document/media object may allow the metadata specification of document and media object types. Viewer and editor applications may support the types. The following include some, not all, exemplary types:

Word Document
    Excel Spreadsheet
    MPEG 3
    MPEG 4
    JPEG
    GIF
    Windows Bitmap
    Windows Media Audio
    Windows Media Video
    PDF In some embodiments, the following metadata information may be tracked:

Created Date—the date and time when the object was created.

Created By—the ID of the User who created the object.

Last Modified By—the ID of the User who last modified the object.

Last Modified Date by User—the date and time when the object was last modified by a user.

Last Modified—the date and time when the object was last modified by a user or process, such as a trigger.

Fields may contain data that is part of an object the metadata defines. Default or initial values for fields can be defined in the metadata definition.

In various embodiments, there may be three types of relationships supported by the metadata definitions that have ramifications with respect to the use, function, and storage in a data structure. These three types of relationships may comprise a contain relationship, a reference relationship, and an inheritance relationship. The contain relationship may comprise a relationship between metadata definitions where one metadata definition completely contains another metadata definition. In one example, a specific instance may contain data, which the metadata definition defines. In some embodiments, the data may only be accessed through the containing metadata definition. In one example, if more than one of the contained object type can be contained, then a list of objects may be contained, the list may be traversed, the number of items in the list may be queried, and objects may be added or removed from the list.

For example, an employee metadata definition may be defined to contain an address metadata definition. When an employee object is instantiated (corresponding to a row in an employee object table in the database), the employee object contains an address object (corresponding to a row in an address object table). Since the relationship defined between employee metadata and address metadata is a contain relationship where the employee object contains the address object, the specific address object for this employee may only be accessible through the employee object via a reference to the employee object and a change to the value of the address object (such as a new street address) will only affect the employee object containing the specific address object.

The reference relationship may be similar to the contain relationship in that one object may reference another, except that other objects may reference the specific object being referenced. In one example, if the referenced object is modified, all objects referencing the referenced object may see the change. When an object that effectively appears to be contained is actually referenced, the object may be found without going through the referencing object. Those skilled in the art will appreciate that either direction of the reference may be traversed. In some embodiments, a parent and child designation with the relationship can be defined.

For example, the reference cardinality may be one to one, one to many, many to one, or many to many, with respect to the objects, regardless of whether or not a parent/child designation is made. If there is more than one object on one side of the relationship, the list of objects may be traversed, the number of objects may be queried, and objects may be added or removed from the list.

In one example, there may be many committees in an organization and an employee may be a member of more than one committee. This information model may require a many to many parent/child reference relationship where the committee is the parent and the employee is the child.

The inheritance relationship may provide a method to specialize a metadata definition, and hence objects, without modifying the underlying definition and without affecting applications that are using the underlying definition directly. If a new definition inherits an older definition, the new definition may have the attributes, information, and actions associated with the old definition, except for specific changes and new additions specified in the new definition. Inheritance relationships may be one to one with a "well defined" parent or base definition as well as a child or sub-definition that specifies the base or parent definition. A metadata definition may inherit from another metadata definition that has inherited from yet another metadata definition, allowing for arbitrary levels of inheritance.

For example, a regional manager may have both direct individual employees and manager employees, a region designation that contains multiple branch offices, and a regional management role. Other management behavior and data needed by all managers may be contained in the manager object. The regional manager object may gain all behaviors and data, unless new objects and data specific in the regional management metadata definition override the behavior and data in the manager metadata definition. In some embodiments, a national manager metadata definition may inherit from the regional manager metadata definition.

In various embodiments, fundamental classes of metadata may be defined as part of the application development platform. These classes may provide interfaces to the following platform services:

Authorization
    Business Object
    Business Process
    User Interface Object
    Services
    Integration
    Submission Definition Authorization metadata may provide an interface to a platform security system. The security system may provide functions for defining logins, users, user groups, roles, views, and/or the login system.

User metadata may define a profile of a user. In addition to providing security and authorization information, such as password, roles, and/or group membership, the user profile may comprise contact information, user preference information, and/or information about what methods the user is allowed to use to login (e.g., the platform may allow multiple types of logins, such as web login and e-mail login). For security, a variety of authentication methods may be provided, including time sensitive encrypted e-mail content for authentication of an e-mail upon receiving an e-mail.

Contact information for a user may include an e-mail address and may include other information, such as multiple phone numbers (e.g., office or cell), office number, business address, and home address.

In some embodiments, a user may be part of multiple user groups and may have multiple assigned roles. If a user is a member of more than one user group, then one of the groups may be defined as the user's main user group. If a user has more than one role assigned, then one of the roles may be defined as the user's main role. In some embodiments, a metadata manager determines various default behaviors of an application that may be associated with a particular role or user group. The default behavior of the application may support the user's primary role and group activities as the user's main activities, while providing access to features and actions the user is allowed via secondary roles and groups. In various embodiments, every user has at least one role, even if it is an administrator role.

A user group may comprise a group of users. In some embodiments, users may be a member of one or more user groups. By assigning permissions and roles to a user group, permissions and roles may be assigned to all of the users in the group.

User groups may be nested, allowing user groups to be in a user group. This may allow larger scale administration by collecting groups along organizational structure or administrative needs. A group can be a member of any number of user groups. In some embodiments, circular references may be allowed. In other embodiments, circular references are not allowed.

One reason for allowing nested user groups and multiple user group membership is because of the proliferation of matrix management and multi-function teams. Within an organization, an employee may be part of multiple functional teams and needs to have the permissions and roles associated with all teams that they are a part of.

A permission object may be used to specify what a user or a user group is allowed to do. A permission assigned to a user group may apply to one, some, or all users in that group. In some embodiments, a permission applied directly to a user may override conflicting permission assigned to that user's group. A permission applied to a child group that is a member of a parent group may override for that child group conflicting permission assigned to the parent group. A user's permissions may be the least restrictive union of all permissions assigned to the user directly or any group of which the user is a member.

In some examples, permissions may apply to business object access, service access, and/or view access. Business object access may specify create, read, write, and delete access for a business object. In one example, a sales person may have permission to fully access a customer business object. A product manager may be able to read and write the customer business object, but may not create a new customer business object or delete an existing customer business object.

Service access may specify what services a user can use and the level of use allowed. As the platform is developed out, additional services can be used in an application. Services may include, but are not limited to:

Internal E-Mail: The ability to send an e-mail to users or user groups.

External E-Mail: The ability to send an e-mail to any number of people that externally accessed the system, such as proposal submitters. This type of service may have different levels of access, such as being able to send one e-mail at a time versus a blast to every submitter.

Calendar: The ability to access and modify a calendar. This type of service may have different levels of access, such as view only access versus the ability to create, delete, or modify calendar events.

View access may specify what pages a user can see (view) and access. Those skilled in the art will appreciate that even if a user can view a page, there may be capabilities on the page that cannot be used due to business object access and service access. For example, only people involved with finance or a need to know about the financial information in a company may be allowed to look at and change budget pages. As an accounting control, the accounting department may have the ability to make changes to the budget. The CEO may have view access to read the budget but not make changes.

A role is a collection of permissions. When a role is assigned to a user or a user group, permissions associated with the role may be assigned to the user or user group. If a permission is removed from a role, then the permission may be removed from the users or user groups that the role has been assigned to (if they had obtained the permission only from that role). Any number of roles may be assigned to a user or user group. Roles may be nested or not nested. A role may be associated with one or more parent roles. In some embodiments, there may be circular roles. In other embodiments, there may be not any circular roles. Roles may be an administrative construct to allow collections of permissions to be grouped and managed.

Those skilled in the art will appreciate that there may be many reasons for the nesting restriction of many children to one parent role, including, but not limited to:

With the use of user groups, any effective role and permission relationship can be created by assigning a role to a user group and nesting user groups.

Roles need to be thought out very carefully, as they provide easier permission setting, and having nested roles can make it too easy to create permission structures that are not well understood.

Having both nested groups and nested roles is too complex.

One example of a role is an Administrator role. A user with an Administrator role may have rights to access all objects. In another example, within the constructs of a typical business organization, a Financial role may provide visibility into financial business objects and be assigned to a Accounting user group as well as a ExecutiveManagement user group.

In some embodiments, every role may have an associated workspace configuration. For example, when a user executes an application under a specific role, the user may view a home page associated with a workspace configuration associated with that. For example, if a user has a financial role and logs into an application as that financial role, then a financial role workspace may be the home page of that login.

In various embodiments, workspaces are effectively user interface objects that may provide a user interface entry point of the application for a user and encompass multiple user interface forms, dashboards, hierarchy trees, and user interface objects. Workspaces may have an area for notification alerts, so that a user in that workspace is aware of work to complete or important messages. In some embodiments, the workplace roles are separated from permission-collection roles.

In some embodiments, every user may have a personal workspace independent of what roles they have. A user's personal workspace may be customized for each user. If a customized personal workspace has not been defined for a user, then a default personal workspace may be the workspace for the user's main role.

Many users may have multiple roles and a user may access and/or view information across roles. For example, a CEO may have a sales role and a financial role. The CEO may wish to view sales numbers and budget information every time he logs in. The CEO's personal workspace may have sales report information and budget report information.

The metadata manager, business rule manager, inbound communications manager, and server side scripts/logic 208 are further described herein. The web browser rendering 212 may be performed on the user device. For example, a presentation manager (further described herein) may request information from a user by providing an interface that is rendered on the user's web browser.

Figure 3:
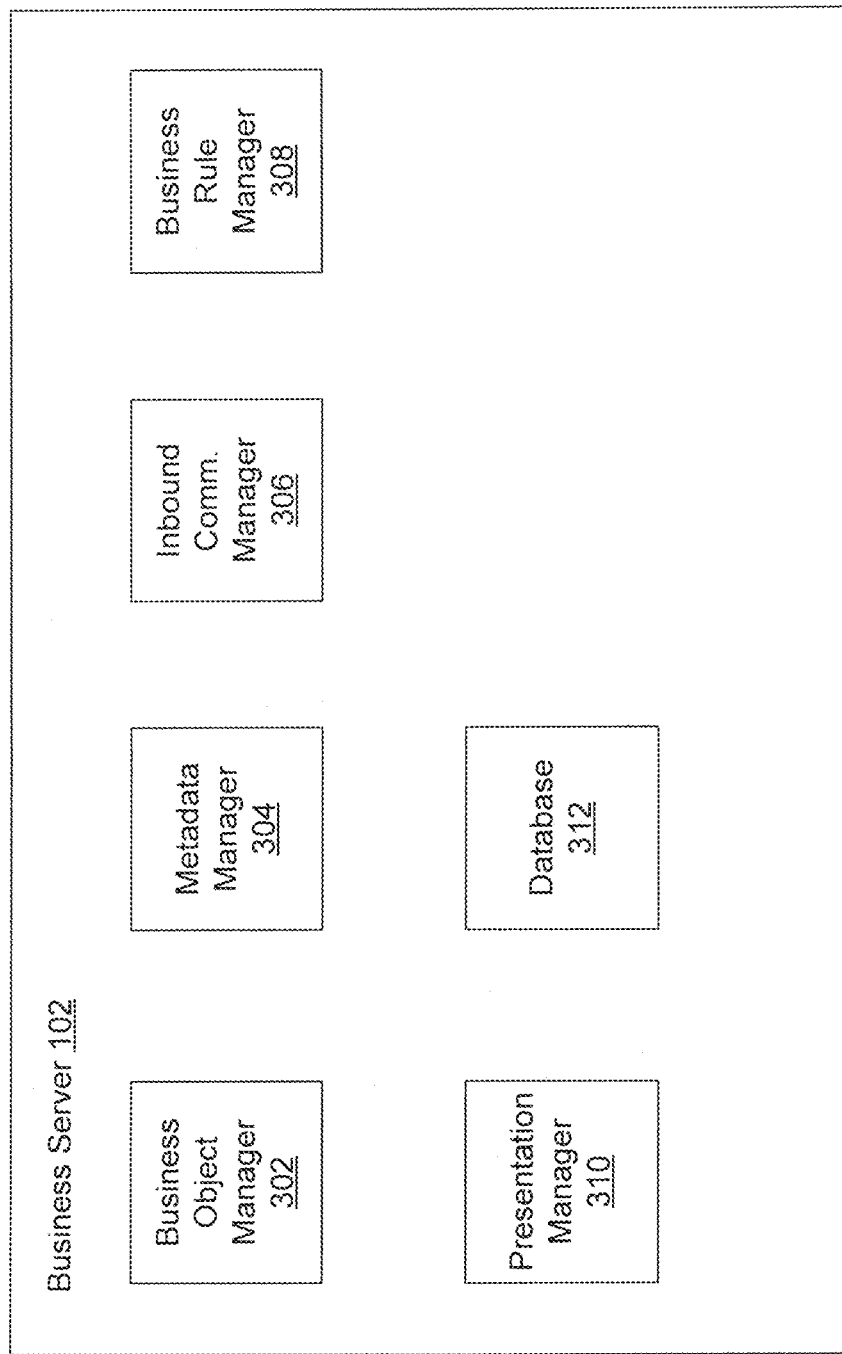
FIG. 3 is a block diagram of an exemplary business server in some embodiments.

FIG. 3 is an exemplary business server 102 in some embodiments. The business server 102 and/or the provider server 104 may comprise a business object manager 302, a metadata manager 304, an inbound communication manager 306, a business rule manager 308, a presentation manager 310, and a database 312. Those skilled in the art will appreciate that all or some of the components in FIG. 3 may be performed by any digital device.

The business object manager 302 may manage creation, reading, updating, and deleting business objects. Business objects are described using metadata that may be managed by the metadata manager 304. Business objects provide an arbitrarily complex object-oriented description of information. In one example, the business object manager 302 stores and retrieves business objects and/or business object information in a relational database system (e.g., database 312).

The business object manager 302 may provide for query capability to read and update lists of business objects based on conditional expressions for matching business object attribute values.

Further, the business object manager 302 may interact with the metadata manager 304 to obtain metadata definitions for business objects. The business object manager 302 may manage the business objects according to the metadata definitions.

In various embodiments, business information that is stored and tracked within a deployment may be created as a business object. In some embodiments, the power of business objects may be realized when the metadata features (as described herein) are used to create complex business object information models. In one example, by using the contain reference, inheritance, document/media object attachment, and data versioning features, rich and complex information models may be created. Business objects may comprise an instance ID that is unique if combined with the metadata type and metadata name information for the metadata that defines the particular business object.

Expected primitive types may be supported as fields of a business object. The following is an exemplary list of primitive types:
Character String
Binary String
Integer
Floating Point Decimal Number
Fixed Point Decimal Number
Boolean
Date
Time
Date/Time
Currency
Enumerated: Allows one value out of a set of string values. This will typically be used to represent state values.
Any Business Object Type as reference or contained
List of any of the above types Business object fields may comprise names, field types, and data types. Additional information may be stored about a field to support functional uses of a field. An example of a functional use of a field is how a field can be used in a report, such as whether or not grouping can be done by this type of field. Using the above field primitives, specifications and metadata features, rich hierarchical business information models with rich media content may be created.

In some embodiments, the business object manager 302 provides users the ability to access information. User interface and process objects may use the business object query capability to access a business object information model.

In some embodiments, the business object manager 302 may support a variety of queries including, but not limited to, ordered list query, ordered join query, business object union query, single business object query, single business object join query, and/or stored procedure call query. An ordered list query may returns a list of business objects using field sorting and filter information to determine which business objects are returned in the list and the ordering of the business objects.

The ordered join query may return a set of records which are determined by a join of multiple business objects using field sorting and filter information to determine which business object's records are in the join result set and the ordering of the records. In some embodiments, a requirement of the join is that there may be a field in the first business object that identifies specific instances of the second business object. In one example, there may be a query of proposals within a specific department, restricted to a size of less than $100,000 cost or less. Proposals may be one business object, Departments may be another business object, and the field filter on the Proposal objects may specify that the Cost field was less than or equal to $100,000.

The business object union query may returns a union of business objects which are determined by the effective union query of similar business objects, which may be an SQL union query against multiple tables. In some embodiments, the business object types in a union query may have the same or similar fields, but where multiple types of business objects are dissimilar with respect to some fields, NULL field values may be used to make the query result consistent for all objects returned by the query. Further, scripting language (e.g., metadata manager, business rule manager, inbound communications manager; server-side scripts/logic 208) may be able to use a list of polymorphic (variant) structures to contain the resultant list of objects, where the type is "queryable" for an element of the list and the valid fields for an element of the list correspond to the type.

A single business object query may return a single business object based on field sorting and filter information. If more than one business object meets the filter and sorting criteria, then the first business object obtained may be returned. The single business object join query may return a single record determined by an effective join of multiple business objects and based on the field sorting and filter information. If more than one business objects meet the filter and sorting criteria, then the first business object obtained may be returned.

The stored procedure call query may execute a stored procedure call that may be defined in a database. This ability may allow the execution of an SQL query against the database.

The metadata manager 304 may manage configuration language of a software system. The configuration language may be used to describe security, data structures, user interface layout, data display, interactive user interface pageflow, and/or work-flow in the system. The configuration language may describe all or some aspects of the system as well as relationships, visibility, roles, and privileges across different parts of the system.

The metadata manager 304 may keep track of entity descriptions, relationships, access, visibility, privileges, and changes to and versions of configuration information. The metadata manage 304 may also store and/or retrieve metadata information in a relational database system (e.g., database 312). In some embodiments, the metadata manager 304 may generate, modify, provide, or remove, the following metadata constructs:

Authorization: Metadata for the security system including the following:
User Authorization: Metadata for defining users of the system.
Group Authorization: Metadata for defining groups of users of the system.
Permission Authorization: Metadata for permissions that users and groups can have in the system.
Role Authorization: Metadata for groups of permissions that can be assigned to users and groups in the system.
Business Object: Metadata for hierarchical data structures managed by the business object manager 308.
Business Process: Metadata for processes and actions managed by the business rule manager 308.
User Interface Object: Metadata for user interfaces managed by the presentation manager 310.
Services: Metadata for services managed by the business rule manager 308.
Submission Definition: Metadata defining the input user interfaces and data collection managed by the inbound communication manager 306.

In some embodiments, the metadata manager 304 supports login controlling metadata to specify timeout information and expiration of cookie information for remembering log-ins from a specific internet browser.

When working with some types of data objects corresponding to metadata definitions, versions of data objects may be created. For example, a version may be created when the data of an object is modified and/or when the data is committed to the database. The created version may be used to specify if the modified data creates a new version of the object or if it completely replaces the previous object. Different versions of an object may be used to access and/or query older or newer objects. In some embodiments, one or more versions of an object may be deleted. Those skilled in the art will appreciate that when an old version is read and modified, the old version may not be modified but rather a new version of the object with modifications may be created.

In one example, a system may modify a proposal through a review or a submission process. Each time a reviewer or submitter modifies and commits the modifications of the proposal, a new version may be created, but the previous versions may be preserved and can be accessed. This may be needed for either keeping a historical record of changes to a proposal or for the ability to undo and redo changes to a proposal.

In various embodiments, tracking of a field or an entire type of object can be activated using an attribute flag for the entire object type or a specific field with the object type. When a user modifies or a process (such as a trigger) modifies an object or field that is specified to be tracked, a new entry may be added to an automatically created history tracking table. The entry may describe the object or the specific field of the object. For example, the entry may include the time of the change, what changed the information, the type of change that occurred, and/or the specifics of the change. In some embodiments, the data versioning feature may be used to track specific values that changed, the history tracking feature may track time, the identifier of the individual who made the change, the type of change, and/or the actual content changes at the value level.

In various embodiments, a service may comprise a base set of metadata definitions, business objects, and/or business rules may be generated (e.g., by the service provider 104). The service may be provided to a plurality of clients (e.g., business servers 102). Each client may alter the metadata definitions, business objects, and/or business rules. For example, a first client may not alter the metadata definitions, business objects, and/or business rules, while a second client may add a request for additional information (i.e., a fax number). A third client may also alter or add a business rule. Each change or addition may create a new version of a metadata definition, business object, and/or business rule which may be tracked. As a result, many different clients may use a foundational metadata-configurable system and make controlled modifications.

If the foundation metadata-configurable system is subsequently altered or updated, the system provider 104 may compare the proposed change to each different system and the version changes. As a result, individual action may be taken to correct incompatibilities before the change to the foundation system is effected. In the example above, if a new metadata definition, business object, and/or business rule is added to define a fax number, the change may conflict with the second client who already customized their solution to include a fax number. Since the versions of the metadata definitions, business objects, and/or business rules are tracked, this possible problem may be identified and the client contacted before a change is made. Alternately or in addition, changes may be provided to other clients who do not have a conflict.

In some embodiments, the metadata manager 304 may support localization where text is displayed (e.g., user interface displays and error displays). Localized versions of display text may be isolated in the metadata or in external resource files so that they are easy to find and localize. In one example, localized version of metadata may be accessed based on either default web browser language settings, by explicit language settings by a user through the browser, and/or for a user by an application administrator.

Those skilled in the art will appreciate that localization may allow for cascading dictionaries or lexicons so that a particular customer may access appropriate regional variations as well as company-specific variations. When a localized string cannot be found at one level, the metadata manager 304 may go to the next level for the translations. In some embodiments, the metadata manager 304 may be configured to default to a main language such as English or German.

Text labels may be used to characterize a field in a user interfaced. A canonical display text may be used that cannot be changed by a client. The canonical display text may be associated with a displayable text field that is customizable and subsequently stored.

The implementation of canonical display text may provide a command shortcut that turns on canonical text display for support situations. In one example, a support engineer can look at a deployment and identify the controls and various displayed text by looking at the canonical display text. In some embodiments, the canonical display text is displayed in "help" bubbles or in some way that does not occlude the customized text, such that the customized text is still visible at the same time.

Since metadata definitions can be changed and pushed to the metadata and data storage 202, the metadata manager may manage a versioning mechanism. In one example, the metadata manger may identify and track original metadata definitions that may be in a particular deployment, determine if any of the metadata has been changed, and determine what version of a metadata definition may be currently in use. The metadata manager may use the GUID and version information to identify a metadata definition and changes to metadata definitions. For example, every time a metadata definition is changed, version information may be changed to uniquely identify the new definition (even though the definition may retain the type, name, and GUID). When a change to metadata is made that causes the external version to be modified, the previous version of the metadata definition may be archived in a data structure (e.g., specific database table) so that the original metadata definitions may be used to determine the differences between the old and the new definitions. Since the GUID may not changes, the old metadata definitions may be found via the GUID.

In some embodiments, the internal or external version may be a simple integer or value that may be changed such that the new value can be used to differentiate the previous value from the newer value. In one example, if a simple integer is used for the external version, then the external version may be incremented for each subsequent new version created. Those skilled in the art will appreciate that when a metadata definition is modified, the associated data may change, as the modifications may define new data for an object corresponding to the metadata definition, and the view may change, as there may be new security or access for the new definition.

The inbound communication manager 306 may handle inbound communications information gathering from submitters. For example, the inbound communication manager 306 may manage information received from a user interface, forms received via a web server, information received from the forms, updated forms, or the like. In some embodiments, any form of electronic data transfer of information is a valid form of data that may be gathered. The inbound communication manager 306 may use, but is not limited to, the following information gathering methods:

Web-based submission portal
E-Mail
File Transfer Protocol (FTP)
Hand-held scanner
FAX
Cell Phone Short Message System (SMS)
Touch-tone phone
Spreadsheet
Word processing document
Postscript Display Format (PDF) document
Web services In various embodiments, the inbound communication manager 306 may define specific proprietary formats and allow industry standard formats for other following data collection methods as well as any other methods that may be implemented, including, but not limited to:

E-Mail
File Transfer Protocol (FTP)
Hand-held scanner
FAX
Cell Phone Short Message System (SMS)
Touch-tone phone
Spreadsheet
Word processing document
Postscript Display Format (PDF) document
Web services In various embodiments, the metadata managed by the metadata manager 304 may describe the type of data handled by the inbound communication manager 306, how the inbound communication manager 306 collects the data, and what business objects the inbound communications manager creates. After collecting data, the business object manager 302 may create business objects representing the data collected. The presentation manger 310 may provide user interfaces, such as the web-based submission portal.

The business rule manager 308 may manage scheduling services, messaging services, notification services, web services, and any service required for work-flow automation, automated response to communications, and integration with other software systems. The business rule manager 308 may determine when to use services and what to do with the services using the metadata managed by the metadata manager 304. The business rule manager 308 may access business object information via the business object manager 302 for use by the services. The business rule manager 308 may provide, but is not limited to, the following services and processes:

Methods that implement formulas using business object information.
Methods that execute sets of actions based on conditional business object values.
Execution of scripting languages.
Web service calls.
Data integration services for integration with $3^{rd}$-party applications.
Import and export services to a variety of data formats, such as spreadsheets.
Notifications and alerts through user interfaces, e-mail, and other communication methods; Creates an alert or notification. Notifications can use business object information and formula method results as part of their creation.
Scheduling services for scheduling recurring or single alerts and notifications based on both time schedules and conditional expressions from business object information. May be used to schedule recurring or single alerts and notifications based on both time schedules and conditional expressions from business object information. Should allow specification of days of week, days of month, days of quarter, etc. Allows deletion and modification of scheduled items.

Calendar: Provides a calendar user interface for creating, viewing, and modifying scheduled items.

E-Mail services for sending of e-mail to a user, a submitter, or any e-mail address. May allow the sending of e-mail to a user, a submitter, or any e-mail address. The e-mail can contain business object information and formula method results and e-mail addresses can be obtained from any data object in the system. It should be noted that if an e-mail contains a URL that uses a browser to login, for security purposes, the browser will need to prompt for username and password or will need to have the login credentials stored as an encrypted time-sensitive cookie.

E-Mail blast services for sending of e-mail to a group or all users, a group or all submitters, or a list of e-mail addresses. May allow the sending of e-mail to a group or all users, a group or all submitters, or a list of e-mail addresses. The e-mail can contain business object information and formula method results and e-mail addresses can be obtained from any data object in the system.

Data cleansing services for data de-duplication for names, addresses, and contact information.

Geo-location services for zip code lookup and verification for addresses and the ability to determine specific information for one or more zip codes, for address verification, and for GPS coordinate lookup Tax ID verification services for verification of a tax ID for a specific person or organization.

Chat/IM services to allow users or submitters to chat/IM with each other.

The business rule manager 308 may manipulate business object information and create business rules that effect change in business object information, the deployment of the system, and in other applications. The business rule manager 308 may modify business object information and execute application behaviors based on conditions and events.

In various embodiments, formula methods describe algorithms to calculate resultant values from business object fields, which can be assigned back to business object fields. Exemplary formula methods include, but are not limited to:

Algebraic Formula Methods—Describes a formula using field references and algebraic notation to calculate a value.

Script Formula Methods—Use a scripting language (such as JScript or Javascript) to implement the formula method.

External Library Formula Methods—Calls methods in an external library to execute the formula. Business object field values are passed in as parameters and business object field values are set from the returned result of the call.

Web Service Formula Methods—Calls a web service to execute the formula. Business object field values are passed in as parameters and business object field values are set from the returned result of the call.

Action methods of the business rule manager 308 may specify operations to manipulate business objects and affect application behavior. Exemplary action methods may include, but are not limited to:

Create Business Object—Creates business objects and assigns values to fields using the business object type and initial field values as input.

Copy Business Object—Given a business object as input, creates a new business object that has all of the same content, but a different instance ID.

Modify Business Object—Assigns values to business object fields.

Delete Business Object—Deletes business objects.

Service Call—Calls or uses a service with data values taken from business objects.

Notification Alert—Creates a notification alert for users or groups with data values taken from business objects.

Script Action Methods—Use a scripting language (such as JScript or Javascript) to implement the action method.

External Library Action Methods—Calls methods in external libraries, passing parameter values from business objects.

Web Service Action Methods—Calls web services, passing parameter values from business objects.

Business rule manager 308 execution conditions may be logical expressions that can be formed from business object field values, formula calculation results, and/or queries that return a single value. In some embodiments, conditions can be referenced where a condition is required.

Business rule manager 308 execution events may be specified in a business object metadata and may describe what formula or action methods should be executed if a condition is met at the time of the following events on the business object. A scripting language (such as JScript or Javascript) can be used to implement a method. Exemplary execution events may include, but are not limited to:

Business Object Create Event: After a business object is created.

Business Object Load Event: After a business object is loaded.

Business Object Save Event: Before a business object is saved.

Business Object Deletion Event: Before a business object is deleted.

Business Object Field Modification Event: After a specific business object field is modified.

Business Object Modification Event: After any part of a business object is modified.

External DLLs may be attached and used to execute external library calls, as mentioned in the formula and action methods descriptions. This may allow the use of library-based APIs and other external functions.

As described in the description of formula and action methods and frame metadata, web services may be an integration method for accessing web service APIs, web service functions, and for displaying HTML, etc., via web services.

Adapters may provide the ability to access external databases as business objects. In some embodiments, there are 2 methods for adapters to access the data, including but not limited to:

Real-Time Query: When the business object is accessed, the SQL queries for accessing the business object are executing, populating the business object in real-time.

ETL Query: A business object cache for the external data is refreshed based on a specified refresh time. At the refresh time, the external database is queried and the resultant business objects are cached.

An API allowing typical programming languages, such as Java, C and C#, may provide access to metadata, object information, and queries. The API may also allow developers to create new features that are compliant to metadata and services APIs.

In various embodiments, the business rule manager 308 may import and export data to populate the object entities defined by the metadata. This may allow the initialization of business objects and user interface objects or may allow the ability to snapshot an entire application state and the restoration of that application state.

In some embodiments, in the case where there is a relational database table for a business object with many (e.g., millions) rows, a new column may be added to support a new business object attribute. If the column is populated with NULL values and the logic in the system gets the default value from the metadata if the column is NULL, then the update of the table may be very fast. Of course, if the table is smaller, the system may populate the new column with the default value.

In addition to proprietary or basic import/export formats, the following exemplary, including but not limited to, import/export formats may be supported:
Excel Spreadsheet
CSV Files
Character-Delimited Value Files The following include, but is not limited to, exemplary services that may be provided by the business rule manager 308:
The following general capabilities between any type of location specification that can be handled by the service:
Distance between locations.
Demographic information for locations.
Determination if a location is a PO Box or not.
Tax ID Verification: Provides verification of a tax ID for a specific person or organization. Can be used to determine the charitable status, such as 501c3 status, of a tax ID.
Outlook Integration: Provides the ability to create scheduled items in Outlook and use Outlook e-mail groups and address book entries.
Data Collection: Ability to receive data, such as submissions, through many data interfaces, such as FTP and direct web service calls initiated by other systems.

For example, the business rule manager 308 may send requests for information using notifications, e-mail, web services, or any other mode of communication to any source that can respond to the requests. The requests and the conditions to trigger the requests may be specified via metadata definitions using action methods, formula methods, or any other conditional trigger mechanism provided in the business rule manager 308. These requests may be sent to multiple sources for response in parallel or as independent serial requests. The conditions that can trigger these requests may include, but are not limited to, time and date, any data condition within any business object, any user interface gesture, programmatic scripts defined in the metadata, and/or any condition that can be defined in the metadata.

The presentation manager 310 may provide interactive web-based user interface layout management and control. In some embodiments, the presentation manager 310 may use metadata managed by the metadata manager 304 to describe the layout and features of web-based user interfaces. As part of the user interface presentation, the presentation manager 310 may read and execute instructions of page-flow metadata that describes what new user interface pages are to be displayed based on the state of the user interface. The presentation manager 310 may provide, but is not limited to, using the following user interface controls:
1. Form
A form represents a user interface page.
2. Frame control
Frame controls can be used as follows:
 a. Provides grouping of any other type of control, providing borders, if specified.
 b. Provides a display area for the result of a displayable and interactive web service call.
3. Dashboard control
A dashboard control may provide a grid. Each rectangle in the grid may contain any user interface control or any groups of user interface controls.
4. Tree control
A tree control provides the following:
 a. Display business object names and field values using any hierarchy and grouping. Arbitrary label icons and text may be assigned to individual items or entire groups of objects.
 b. Display a multi-level parent-child hierarchy, as defined by the business object information model.
5. Data grid control
A data grid control contains information about grid size, position and presentation appearance. There may be attributes for each column containing information about column title, size, presentation appearance and the associated business object field.
6. Toolbar control
A toolbar control provides text and icon buttons. Each button contains information about size, position, image and other presentation appearance. Each button can have a visibility or state condition. When a toolbar button or menu item is chosen, a new form may be navigated to, a form may be brought up as a separate window, or other software instructions may be executed.
7. Chart control
A chart control provides pie, bar, line and other types of charts.
8. Other controls
Other user interface controls, such as menus, buttons, scrollbars, sliders, gauges, collapsible and expandable sections, progress bars, radio control buttons, checkboxes, and other standard user interface controls may be usable.
9. Page-flow
The presentation manager 310 also provides page-flow management.

The presentation manager 310 may access user interface object metadata definitions from the metadata manager 304 and then use the metadata definitions to determine what business objects to work with and to determine the user interface needed to present to users. To work with the business object information defined by the business object metadata, the presentation manager 310 may interact with the business object manager 302.

In various embodiments, form metadata is a specification of how business object information may be displayed using user interface display controls and how business object information is worked with as well as manipulated using user interface controls. Any results from any number of business object queries may be displayed on forms, allowing fields from multiple business objects to be displayed and manipulated from a form.

With user interface objects, a method type, the Display Method, in addition to the Action and Formula Methods described herein, may be defined as a method that controls the display of information or user interface controls. Display Methods may be used to show or hide, activate (ungray) or deactivate (gray), and change the display properties (color, labels, etc.) of tabs or controls.

In one example, there are 3 types of actions that can be attached to a form for automatic execution based on conditions and formulas specified in the form metadata:

Form Load Methods: Before the form is loaded with business information, Formula, Action, and Display Methods can be called to manipulate business objects and application behavior.

Form Exit Methods: After a form is exited, Formula, Action, and Display Methods can be called to manipulate business objects and application behavior.

Condition Methods: Formula, Action, and Display Methods can be specified to be executed any time conditions of data on a form are met.

Those skilled in the art will appreciate that there may be any number of types of actions that can be attached to a form for automatic execution based on conditions and formulas.

Frame control of the presentation manager 310 may provide control and specification of a frame control. Frame controls can be used in many ways, including, but not limited to:

Provides grouping of any other type of control (e.g., providing a border, if specified).

Provides a display area for the result of a displayable and interactive web service call.

The presentation manager 310 may also comprise automatic business control which may provide automatic generation of user interface controls and display from business object fields.

In some embodiments, a user may need to generate controls for survey questions based on a set of questions stored in a business object. The text, type of answer, and valid answers for the questions may be created as field values in the business object and a display with the questions may be automatically generated.

The presentation manager 310 may also perform tree control which provides control and specification of a hierarchy tree control. In some examples, tree control may be used to display business object names and field values using any hierarchy and grouping. For example, arbitrary label icons and text can be assigned to individual items or entire groups of objects. In another example, the tree control may also be used to display a multi-level parent child hierarchy, as defined by the business object information model.

In some embodiments, the presentation manager 310 may perform data grid control which may provide control and specification of a grid control. The grid metadata may contain information about grid size, position, and presentation appearance. Those skilled in the art will appreciate that there may be metadata for each column containing information about column title, size, presentation appearance and the associated business object field.

The presentation manager 310 may provide control and specification of a toolbar control. A toolbar can be horizontal or vertical. A toolbar control may provide text and icon buttons. Each button may contain information about size, position, image, and other presentation appearance. Each button may also have a visibility or state condition. In one example, when a toolbar button or menu item is chosen, a new form may be navigated to, a form may be brought up as a separate window, or a formula or action method may be called.

There may be many predefined methods, including but not limited to:

Exit Application: Exits the application to a non-application page without logging out.

Print: Allows printing of the current page or some part of the current page.

Logout: Logs out of the application.

Navigate to Home: Navigates back to the user's initial workspace page.

Navigate Back: Navigates back to the previous page the user was on.

Navigate Forward: After one or more Navigate Back choices, allows the user to go to a page that was navigated back from.

The presentation manager 310 may provide control and specification of a chart control (e.g., control of pie, bar, line charts, or any other kind of chart). Those skilled in the art will appreciate that query and formula method results may be used to populate charts.

Figure 4:
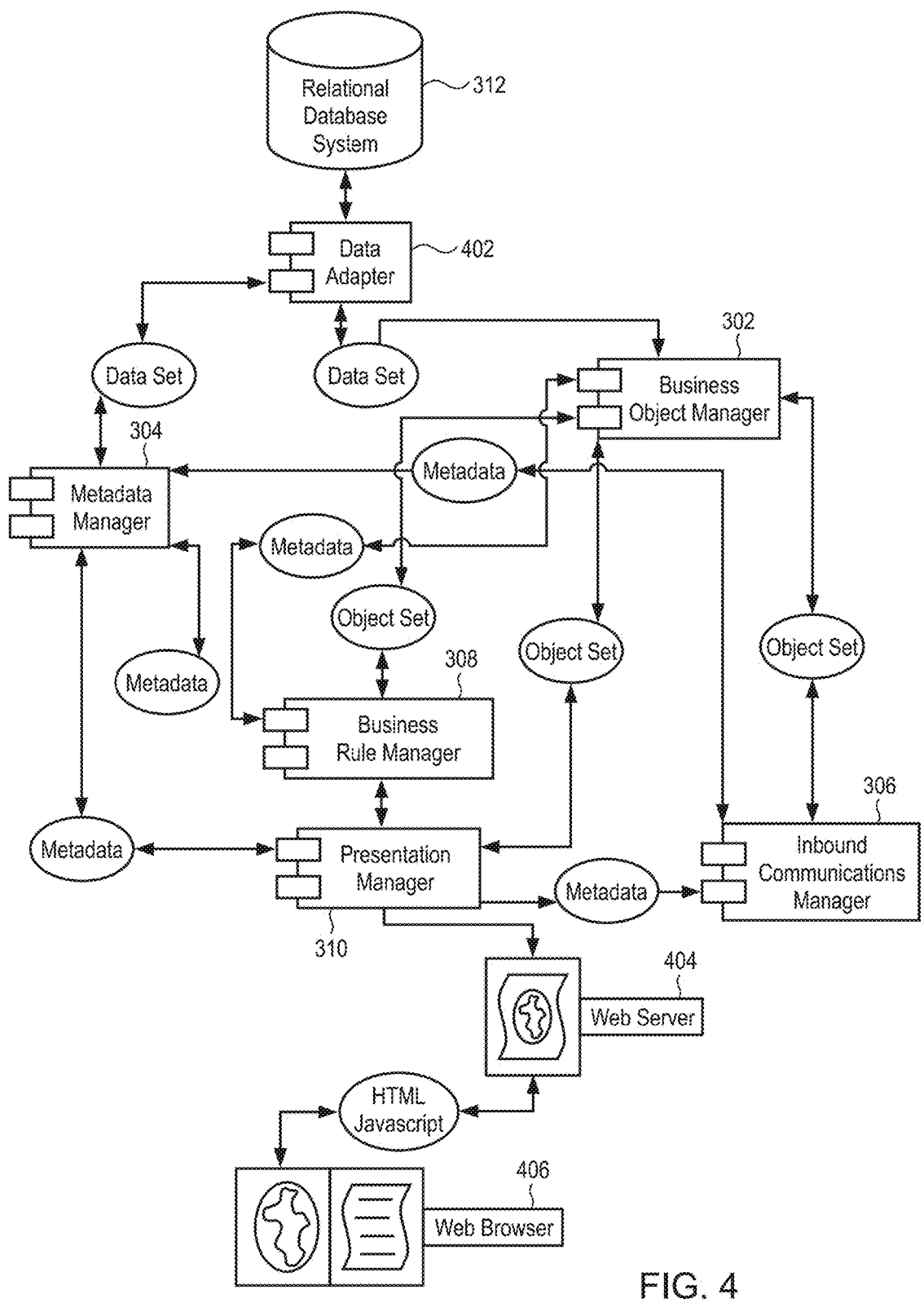
FIG. 4 is an exemplary diagram of the relationships among the business object manager, metadata manager, inbound communications manager, business rule manager, presentation manager, the relational database system, data adapter, the web server, and the web browser in some embodiments.

FIG. 4 is an exemplary diagram of the relationships among the business object manager 302, metadata manager 304, inbound communications manager 306, business rule manager 308, presentation manager 310, the relational database system 312, data adapter 402, the web server 404, and the web browser 406 in some embodiments. The data adapter 402 may retrieve and or store information (e.g., business objects, metadata, and the like) within the relational database system 312.

The web server 404 may receive and provide interfaces (e.g., web pages) from the presentation manager 310. The web server 404 may also receive information provided by the user and direct all or part of the received information to the metadata manager 304, the inbound communication manager 306, and/or the business rule manager 308. Those skilled in the art will appreciate that the web server 404 is not limited to a web server but may be any digital device with or without a server.

The web browser 406 may be resident on any user device. Although FIG. 4 depicts information being provided between the web server 404 and the web browser 406 as being HTML or Javascript, the information (e.g., responses and/or interfaces) may be formatted in any language.

In some embodiments, a web-based submission portal data collection systems and methods of the inbound communication manager 306 may use the presentation manager 310 to display and manage a user interface. Initial submission metadata stored in the relational database system 312 may describe what forms and the order the forms should be displayed for a submitter (e.g., a user) to submit information. The metadata may also specify what web page the user may be sent when the submission is completed. The submission page-flow may have any number of branches or flow to different pages based on the conditions of the data entered by the submitter.

In some embodiments, a submitter may revisit a submission. Those skilled in the art will appreciate that the entity using the application and controlling the submission portal may allow or disallow revisiting a submission as well as what, if anything, can be changed by a submitter.

The inbound communication manager 306 may also provide a submission status which provides the submitter the ability to check on a submission status. For example, the inbound communication manager 306 may provide and/or receive messages about a submission to be posed by and for submitters.

Those skilled in the art will appreciate that attributes that may be used by other features of the system may be defined and set for submission questions. For example, scoring attributes such as the scoring criteria and the scoring weight of the question may be stored as a question attribute. In some embodiments, the metadata manager 304 may approve, deny, request additional information, or contact others for approval based on a business rule and the scoring criteria.

In some embodiments, submitters may be requested to submit answers to a survey regarding a previous submission. In one example, a use of this feature is to get evaluations from submitters for the handling of a submission, such as the evaluation of a sponsored event. Skins may allow a submission portal to have the look, feel, and imaging of the web site of the organization using the system.

Questions may be used by both the incoming communications manager (discussed herein) and for questions that are used in other parts of systems and methods described herein. The presentation manager 310 may provide question editing control. Question editing control may provide the ability to create a set of questions or edit an existing set of questions. The control may allow the setting of question text, the type of answer for each question, valid answers for each question, and the order of the questions.

Those skilled in the art will appreciate that many other controls, such as sliders, gauges, and show/hide sliding panels, may be used and specified via user interface object metadata definitions.

For complex user interface scenarios and situations where very specific user interface process or data entry process is required, page-flow metadata may be used to specify user interface and display flow. Page-flow specifications may have any number of branches or flow to different pages based on the conditions of the data entered by the user.

The sources receiving the request may provide responses using a method that the inbound communication manager 306 may receive communications. Once a response to a request has been received by the inbound communication manager 306 and the data received from the response is converted into a business object, the business rule manager 308 may be used to execute actions based on the information in the business object, including the creation of more requests for information. This general dynamic data collection ability may be used to create virtually any multi-step information request and response process.

Figure 5:
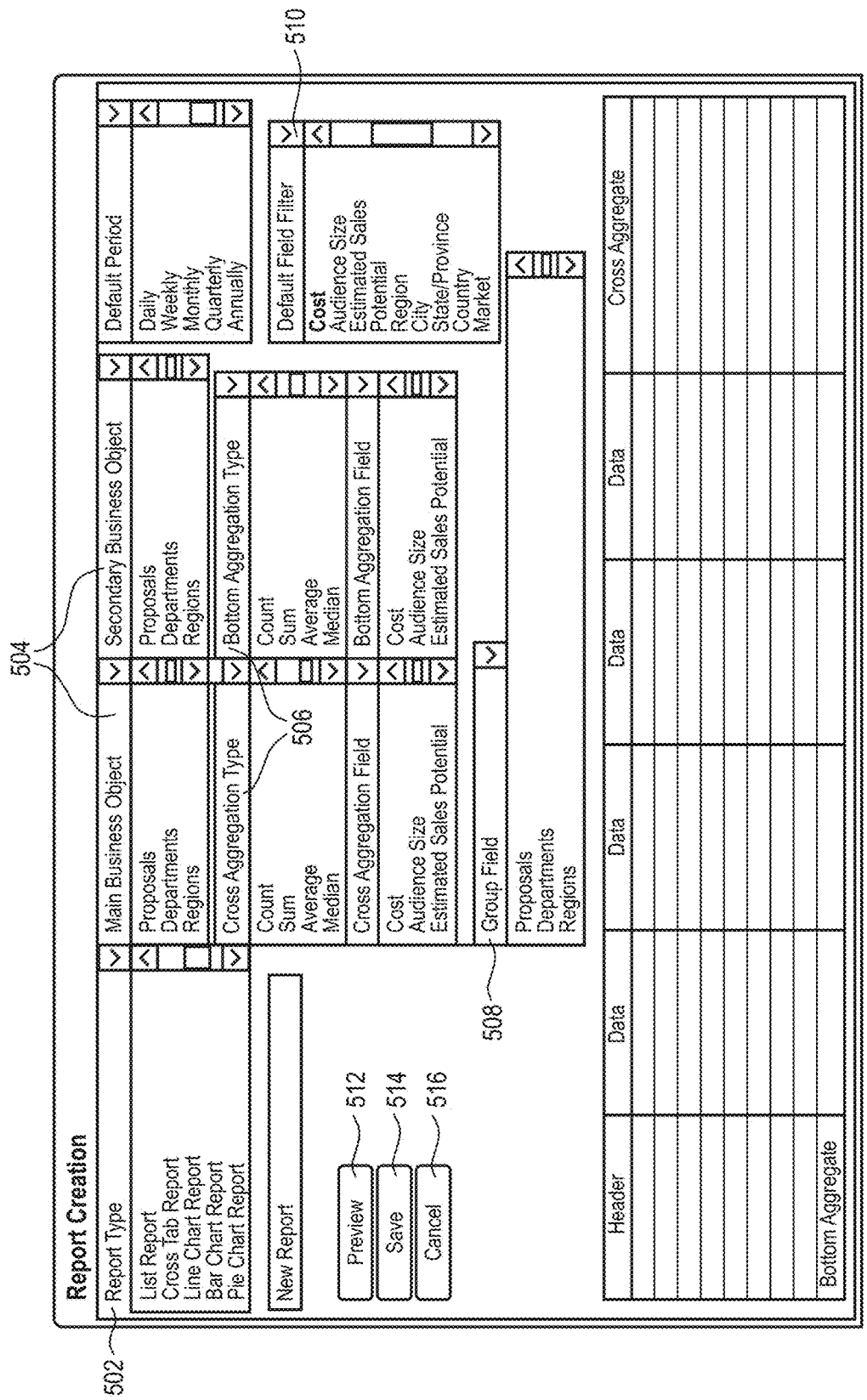
FIG. 5 is an exemplary screen shot of a report generate graphical user interface that illustrates how a user may create ad-hoc data reports the system in some embodiments.

FIG. 5 is an exemplary screen shot of a report generate graphical user interface that illustrates how a user may create ad-hoc data reports the system in some embodiments. In various embodiments, the system described herein allows users of the system to create ad-hoc data reports from business object information which can be displayed by the presentation manager 310 in any user interface.

In some embodiments, the user selects a type of report to create. The report type 502 may be linked via metadata to a type of query that will be run (e.g., by the business object manager 302). New report types may be added via metadata to be supported by this feature example. When the new type of report is created in metadata, the report layout, controls, and the underlying query for the report may be defined in the metadata (e.g., by the metadata manager).

When a report type has been selected, the underlying metadata may dictate whether one or two business objects are needed or can be used for the query. The appropriate main and secondary business object menus may be displayed. From the type of report (and its metadata) the supported business objects may be specified. As a result, in some embodiments, only supported business objects 504 will be listed. If two business objects are needed, a join may be executed across underlying tables of the business objects and the business object definitions may dictate the join ID to be used. For example, if "Proposals" and "Departments" are used as the two business objects, there may be a department reference (department name, ID, or direct object reference) in the "Proposal" business object that may automatically be used to join the two business objects.

If the report type requires one or more aggregations, then the type of each aggregation (sum, average, etc.) 506 may be selected. In some embodiments, once the type of aggregation is selected, only fields that support that type of aggregation 506 may be selected. The field metadata within the business object metadata may be used to specify what types of aggregations a field can support. If the report requires or allows grouping by a field, then the "Group Field" menu 508 may be displayed and only fields that can be used for grouping may be displayed.

The default field filter menu 510 may be used to select a field and the appropriate filter controls may appear to specify the filter conditions. For example, if an integer field is selected, then numeric filter controls may be provided. If a string filed is selected, then string filter controls may be provided. If the field has specific enumerated values, then the filtering controls may provide a way to include and exclude enumerated values. When default field filter information has been selected, this may become the default for the report that is being created.

When "Preview" 512 is clicked, a report may be generated based on the specifications. When "Save" 514 is clicked, the report may be saved with the name specified and the creation window disappears. When "Cancel" 516 is clicked, the cancel may be confirmed and the window may close without saving if confirmed.

Figure 6:
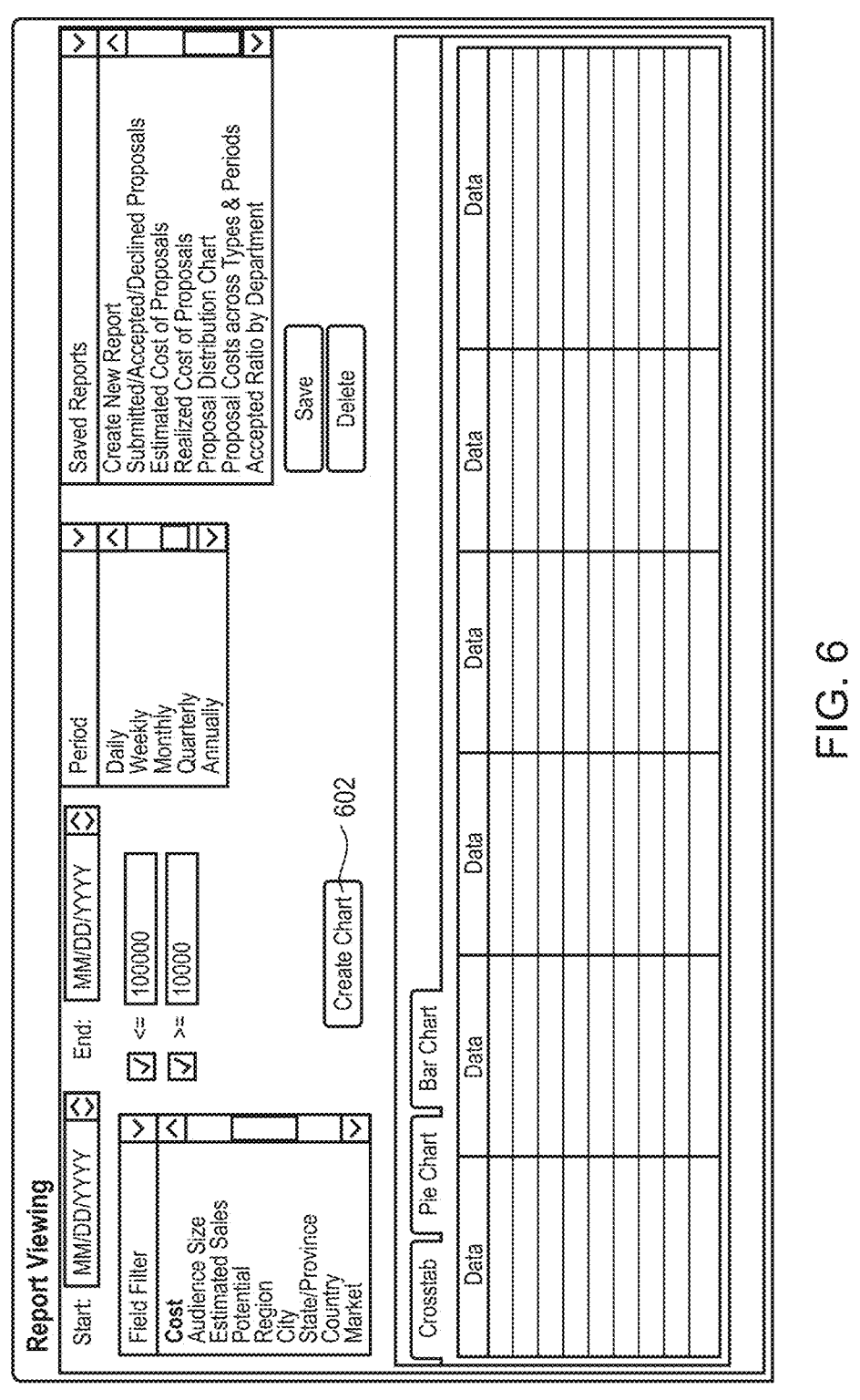

FIG. 6 is an exemplary screen shot of a report viewing user interface in some embodiments. In various embodiments, a pie chart, bar chart, line chart, list, and crosstab reports, or any other chart or report may be supported by systems and methods described herein. Reports may be drillable, allowing a cell, column, bar, line, or pie segment to be clicked on to drill down to a sub-report. Those skilled in the art will appreciate that reports and/or charts are printable.

In some embodiments, a user may generate a chart from a list or crosstab report, where a new tab is created to display and view the chart. For example, when a list report or crosstab is viewed, the user may click a create chart button 304 where a popup (e.g., an AJAX popup) is displayed allowing the selection of the type of chart and the information used to determine the axis and value in the chart. After the chart attributes have been selected, a new tab may be created for displaying the chart. Any number of charts can be created, creating more tabs, as necessary.

In some embodiments, a presentation manager may generate a dashboard. The dashboard may be divided into a grid of cells where each cell, called a "tile," may display reports or any other user interface form, allowing any type of user interface control and layouts of those controls to be put in any tile. Behavior and features of a control, such as report control drill down, may be available when in a dashboard tile.

In some embodiments, data inputs and display of dashboards tiles may depend on each other. For example, if a dashboard has two tiles with a bar chart in the first tile and a pie chart in the second tile displaying data for a specific date range, the date range may be changed for one of the charts and the chart in the other tile may be automatically redisplayed to display data for the new date range. In another example, a tile may contain a bar chart and another tile may contain a list of data. When a bar in the bar chart is clicked on by a user, the other tile may list specific data entries that are associated with the bar in the bar chart. Those skilled in the art will appreciate that dashboards are printable and/or may be used as the data reporting function within the system, including the ability to paginate printed dashboard output.

To provide a user of the system a method of creating and modifying metadata without having to learn the metadata language, there may be graphical editors and tools for metadata creation and modification. The editors and tools may be broken into the following general categories:

User and Role Administration: A GUI administration module for adding, deleting, and modifying users, roles, and user groups.

Business Object Editor: An editor that uses an entity relationship diagram to define objects and their relationships. Context menus on the specific entity relationship blocks and the relationship connectors may be provided to access features for editing metadata definition fields, attributes, and relationship information.

User Interface Object Editor: An editor providing drag and drop creation of user interfaces on a layout screen and the ability access a tree of business object metadata to connect business object fields and information to the user interface objects. Context menus on the graphical controls may be used to access features for specifying control attributes and creating actions.

Workflow Editor: An editor for describing workflow. Conceptually, the editor may allow specific users to be represented graphically, and ability to group users within a workflow tier, the ability to specify multiple tiers with decision branches for which specific parallel tier information flows to next, and the ability to specify the states that information can be in and what can be done to the information by each user within the workflow. One possibility is a block and arrow diagram where context menus allow modification of the specifics of what a block represents (i.e. a user or a group of users), what decisions correspond to a connecting arrow (i.e. approved or declined), and the actual information that is flowed through the workflow (i.e. proposal or resume).

Submission Portal Editor: An editor for creating and modifying submission portal information, such as questions and their attributes, permissions with respect to submissions, such as messaging capability and re-submission permissions.

Dashboard/Report Editor: An editor for the creation of reports and dashboards, where the dashboard concept is essentially a grid of reports and forms.

Some specific features and services in the platform may use an editor that is suited to dealing with the specific feature or service. The Workflow Editor and the Dashboard/Report Editor are two examples of this general concept, as they are editors created to manage and manipulate the specifics of those particular features and services.

In various embodiments, a master editor may be used to access and/or use various editors described herein. The master editor may be access through a master editor user interface to make, for example, application creation, modification, and customization to provide a consistent look and feel and access method for every type of metadata editor.

Those skilled in the art will appreciate that tools may be created for transforming metadata, such as a tool to change a metadata contain relationship to a reference relationship.

The foregoing is considered as illustrative only of the principles of systems and methods described herein. Further, since numerous modifications and changes will readily occur to those skilled in the art, it is not desired to limit systems and methods described herein to the exact construction and operation shown and described, and accordingly, all suitable modifications and equivalents may be resorted to, falling within the scope of the systems and methods described herein.

Figure 7:
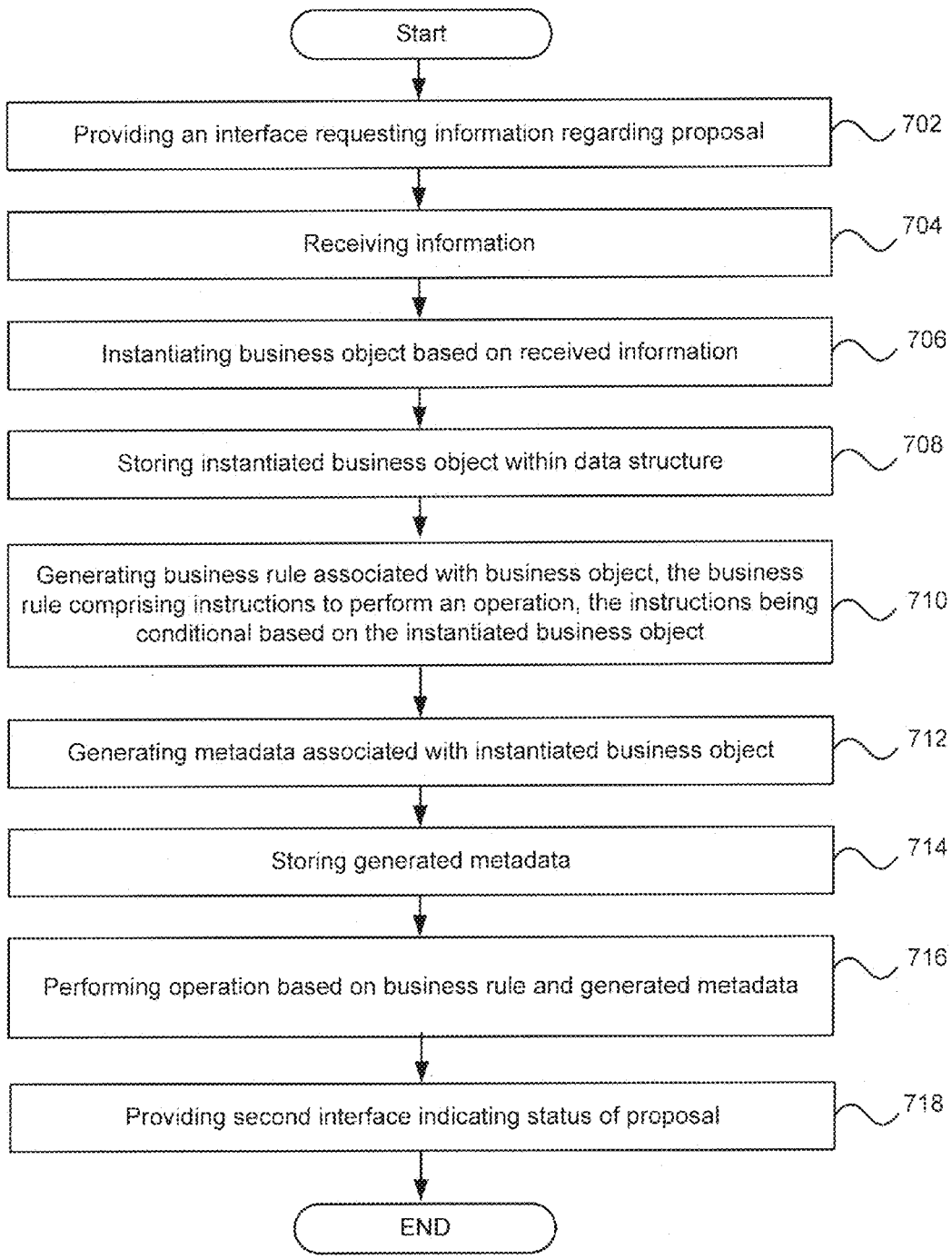
FIG. 7 is a flow diagram of a metadata configurable system in some embodiments.

FIG. 7 is a flow diagram of a metadata configurable system in some embodiments. In one example, a user of the user device 106 may wish to provide a proposal for funding (e.g., a grant) or to receive a charitable donation. An organization may enter into an agreement with the service provider 104 to provide the metadata configurable system and/or services. In step 702, a presentation manager 310 provides an interface requesting information regarding a proposal from a digital device over a network (communication network 108). The presentation manager 310 may generate the interface (e.g., web page) based on instructions from the metadata manager 304.

The interface may include questions and requests for information. The request may be for a user to create an account, provide a username, provide a password, provide an identifier, or any other information.

In step 704, the presentation device 310 receives the information from a digital device (e.g., user device 106) over a network (e.g., communication network 108). In step 706, the business object manager 302 instantiates a business object based on the received information. In various embodiments, applicable business objects are created. Based on information received from the user or organization, business objects may be instantiated and associated with the received information. The business object may be stored in a data structure such as a relational database (e.g., database 312) in step 708. The data structure may be stored within a computer readable medium such as a hard drive, solid state drive, or the like.

In step 710, a business rule manager 308 generates a business rule associated with the business object. The business rule may comprise instructions to perform an operation that is conditional based on the instantiated business object. For example, the user may provide identification information as well as information whether the user represents a nonprofit organization. The organization which approves or denies the proposal may create a business rule such that a proposal will be automatically denied if the user does not represent a nonprofit organization. In this example, the metadata manager 304, based on the business rule, may instruct the presentation manager 310 to display an interface indicating that the proposal has been denied. If the user represents a nonprofit organization, the metadata manager 304, based on the business rule, may instruct the presentation manager 310 to display an interface requesting additional information (e.g., type of proposal, desired funding, and details of the request).

In various embodiments, the organization (e.g., a client of the service provider 104) may create the business rules. The business rules may be created and/or generated before an interface is provided to the user. Further, the organization accepting or denying the funding may edit and create questions or requests for information to be displayed in the interface. The questions and/or requests for information may be stored as business objects, instantiated business objects and/or metadata.

In step 712, the metadata manager 304 generates metadata associated with the instantiated business object and stores, in step 714, the generated metadata in the computer readable medium. The metadata may describe the instantiated business object. The metadata, instantiated business object, and/or business rules may provide instructions to the metadata manager 304. For example, the metadata manager 304 may instruct the presentation manager 310 to display requests for information based on information that had been previously received from the user and business rule(s).

Decisions on the information received may also be automated based on the metadata, instantiated business object, and/or business rule(s). For example, based on information received, the metadata manager 304 may determine that review and/or approval of the proposal is required. Based on one or more business rules, the metadata manager 304 may prepare a report and/or interfaces to provide to another user (e.g., an administrator or other individual) for review and/or approval. The metadata manger 304 may utilize email, chat, IRC, or any other type of communication to provide sufficient information to the other user and receive an indication regarding the review or approval. Based on the business rules, the metadata manager 304 may approve, deny, request additional approvals from other individuals, request additional information from the user, or perform any other action. The metadata manager 304 may track the status of the proposal and contact or provide instructions to contact the user.

In step 716, the metadata manager may perform the operation based on the business rule and the generated metadata. Based on instructions from the metadata manager 304, in step 718 the presentation manager 312 may provide a second interface indicating a status of the proposal. The status may indicate that the proposal is denied, approved, pending, or any other status indicator.

In some embodiments, the presentation manager 312 may present an interface that allows a user or a member of the organization offering the proposal to generate a report. In one example, the report may summarize the information provided for the proposal (e.g., the user, the requesting organization, status of the requesting organization, status of the proposal, or the desired outcome). If a request to generate a report is made, the requester may provide information regarding the content of the report. The business object manager 302 may query the data structure (e.g., query the XML in a relational database and/or provide SQL queries) based on the received information to create the report and retrieve proposal information. The presentation manager may generate and/or display report with the desired information retrieved from the query.

Figure 8:
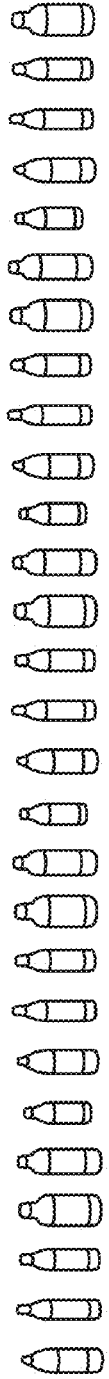
FIG. 8 is an exemplary screen shot of a user login interface in some embodiments.

FIG. 8 is an exemplary screen shot of a user login interface in some embodiments. In various embodiments, a user may access the user login interface via a web browser. The user login interface may be provided by the presentation manager. The user login interface may be standardized for all users to create a new account and/or provide identification and authentication information to access the system. Although many interface are depicted in FIGS. 8-20, those skilled in the art will appreciate that the content of the interfaces as well as the metadata that describes user input may be changed and customized.

Those skilled in the art will appreciate that there may be different ways for a user to log in. In one example, a user may log in through the web interface such as the user login interface. A login may also be accomplished, for example, via an e-mail send. In one example, e-mail login may allow the user to submit a proposal directly through an e-mail send. Another example would be the ability to request a report via e-mail and the report is e-mailed back to the requester.

FIG. 9 is an exemplary screen shot of a template selection interface in some embodiments. The template selection interface may be provided to a user that creates an account. The template selection interface may provide information regarding available services and request information on how the user prefers to proceed. In this example, interfaces 9-20 are utilized provide users the opportunity to submit proposals for philanthropic funding. Those skilled in the art will appreciate that the interfaces may be used in any number of ways and collect information from a variety of entities for any number of purposes.

FIG. 10 is an exemplary screen shot of a preliminary questions interface in some embodiments. The preliminary questions interface may provide the user with a request for information that may be determinative on whether the user should continue providing information (e.g., inputting additional information) or whether, based on a few simple facts, the proposal will be denied regardless of the type and quality of additional information.

For example, the template selection interface of FIG. 9 indicated that, in order to qualify to receive philanthropic funding, the user/proposer must be a qualified non-profit or public tax-exempt organization. If the user/proposer indicates they are not a qualified non-profit or public-tax exempt organization, then an exemplary screen shot of a proposal denial in some embodiments (as depicted in FIG. 11A) may be provided. Alternately, if the user indicates that they are a qualified non-profit or public-tax exempt organization, then an exemplary screen shot of another preliminary question (as depicted in FIG. 11B) may be provided.

Figure 12:
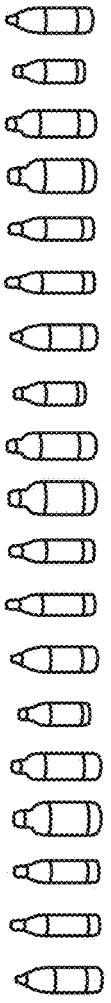
FIG. 12 is an exemplary screen shot for selection of a local client site in some embodiments.

FIG. 12 is an exemplary screen shot for selection of a local client site in some embodiments. In some embodiments, a user submitting the proposal may receive an interface indicating a zip code or other location where proposed action may take place. For example, if an organization is requesting funding for an event, the user may indicate a zip code, area code, address, or any other location information regarding the event. Once submitted, the business rule manager may perform zip code lookup and verification of the information provided to the interface.

FIG. 13 is an exemplary screen shot for determining a local client site in some embodiments. Once the user submits location information within the interface, the business rule manager 308 may determine the closest business sites. In some embodiments, the facilities of the organization performing or fulfilling a proposal may offer use of facilities or require that any activities associated with the proposal be conducted within a predetermined proximity to a facility. Based on the previously provided location information, the presentation manager 310 may provide a map of available locations to the user in an interface to allow the user to select the preferred location, facility, and/or venue.

Figures 14, 15:
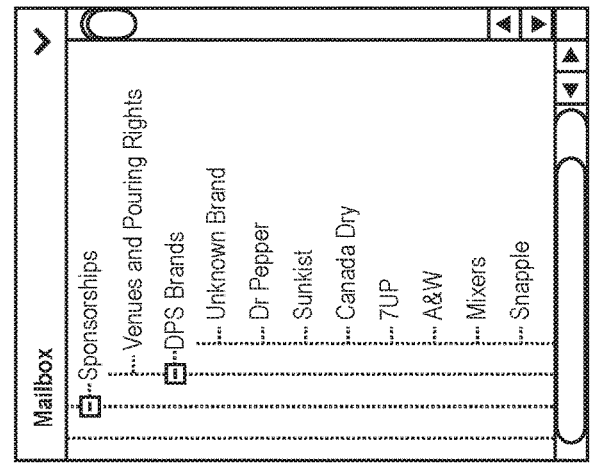
FIG. 14 is an exemplary screen shot of a demographic interface in some embodiments.
FIG. 15 is an exemplary screen shot of a mailbox interface in some embodiments.

FIG. 14 is an exemplary screen shot of a demographic interface in some embodiments. In some embodiments, based on information previously received, the metadata manager 304 may provide instructions to the presentation manager 310 to request information regarding demographics. In one example, the requested demographic may be of the beneficiaries of the proposal. Those skilled in the art will appreciate that although information may be requested, the user may have the option to not provide information, indicate that the information is unknown or uncertain. The metadata manager 304 may apply one or more business rules from the business rule manager 308 to determine next steps (e.g., continue as if information was received, request additional information, deny the proposal, or indicate that the proposal is pending).

Those skilled in the art will appreciate that the interface generated by the presentation manager 310 may have any functionality including those functions associated with a web page. For example, any interface may allow the user to select a position on a map, determine the location of a user if a GPS is available, buttons, pull down menus, or the like.

FIG. 15 is an exemplary screen shot of a mailbox interface in some embodiments. Proposals and/or other information may be accessible in a mailbox used to communicate with one or more individuals. In one example, a company may organize events by association with various brands. The metadata manager 304 may organize submissions, based on one or more business rules, into accessible mailboxes. One or more individuals may have access to the mailbox and at least some of the submitted information. Individuals may also receive communications regarding the submissions (e.g., via e-mail or the like).

FIG. 16 is an exemplary screen shot of tax information interface in some embodiments. A tax information interface may request information regarding the type of organization submitted the proposal as well as a tax identification number. In some embodiments, if the user submitted information indicates that the organization does not meet a qualification (i.e., the organization is not a 501c3 organization), a business rule may dictate that the proposal is denied. In some embodiments, once a tax number (or other information) is provided, the tax identification number may be verified and/or authenticated. For example, the metadata manager 304 and/or the business rule manager 308 may confirm that the tax identification number if valid and has the correct status.

FIG. 17 is an exemplary screen shot of a proposal list interface in some embodiments. The proposal list interface may be generated for a user of the organization providing the proposal or services. In one example, a client may request status of proposals or submissions. The client may filter the request by indicating the desired status (e.g., indicating whether the listed proposals are approved, automatically declined, manually declined, likely to be declined, under consideration, or associated with a VIP). The client may filter the information in any number of ways. Once the filter(s) are indicated, one or more queries of the information stored in the data structure may be performed to retrieve the information.

Once the information is retrieved, the proposal list interface may be depicted. The interface may organize the information in any number of ways. In some embodiments, the metadata manager 304 may provide instructions to the presentation manager 310 regarding the rows, columns, and other information indicating generation of the table and organization of information.

Figure 18:
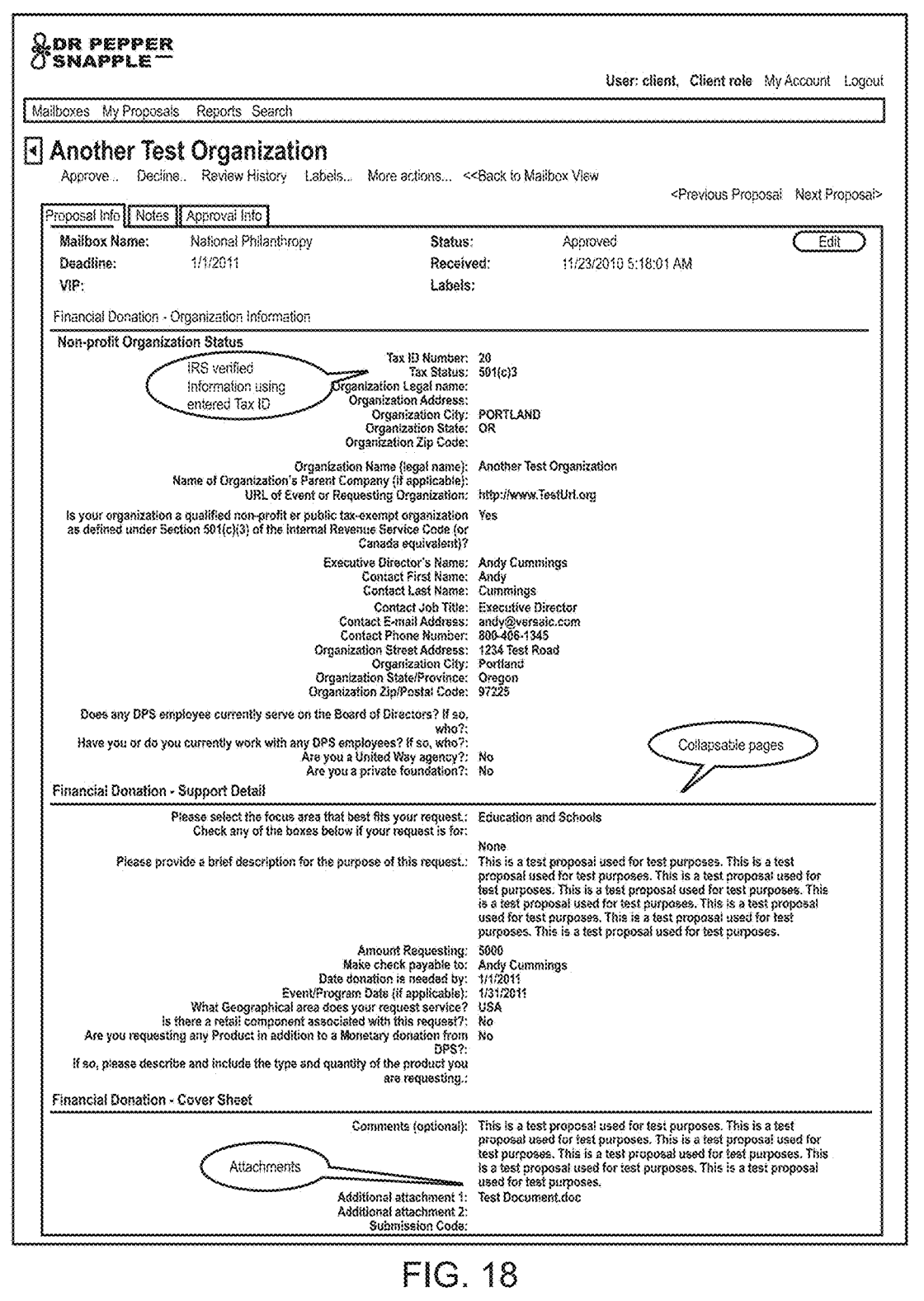

FIG. 18 is an exemplary screen shot of a proposal summary interface in some embodiments. In various embodiments, a client may select (e.g., by clicking on information displayed in the proposal list interface in FIG. 17) an item and receive more information. For example, FIG. 18 indicates that a client requested more information regarding the proposal provided by the Another Test Organization. The proposal summary interface may display information retrieved from metadata, business objects, and/or instantiated business objects. For example, metadata may be used to populate fields regarding the non-profit organization status. Information from an instantiated business object, such as a string of data, may be used to provide comments or other content. Those skilled in the art will appreciate that information from the database may be retrieved and displayed in any number of ways.

FIG. 19 is an exemplary screen shot of a proposal summary report interface in some embodiments. The proposal summary report interface may provide a high level summary of proposals maintained in a mailbox. For example, systems and methods described herein may assess the information and provide a summary based on any criteria or criterion. In this example, the proposals may be broken down into cause related partnership, event and entertainment (non-sports) and financial donation request. Different mailboxes may be created to better organize the proposals. The contents of the mailboxes may also be displayed or summarized for the report. Further, a client may filter the information regarding status of the proposal such a whether a proposal has been approved, declined, or under consideration. Those skilled in the art will appreciate that the information may be displayed and organized in any number of ways based on filters provided by the client as well as the metadata, business objects, and instantiated business objects stored in the data structure.

FIG. 20 is an exemplary screen shot of a custom report interface in some embodiments. Those skilled in the art will appreciate that systems and methods described herein may be customized in any number of ways and may generate many kinds of charts and graphs representing information retained in the data structure. In various embodiments, the organization of the information may be displayed based on submitter, or any other type of organization, such as by available resource, past application of resources, and current commitments.

Figure 21:
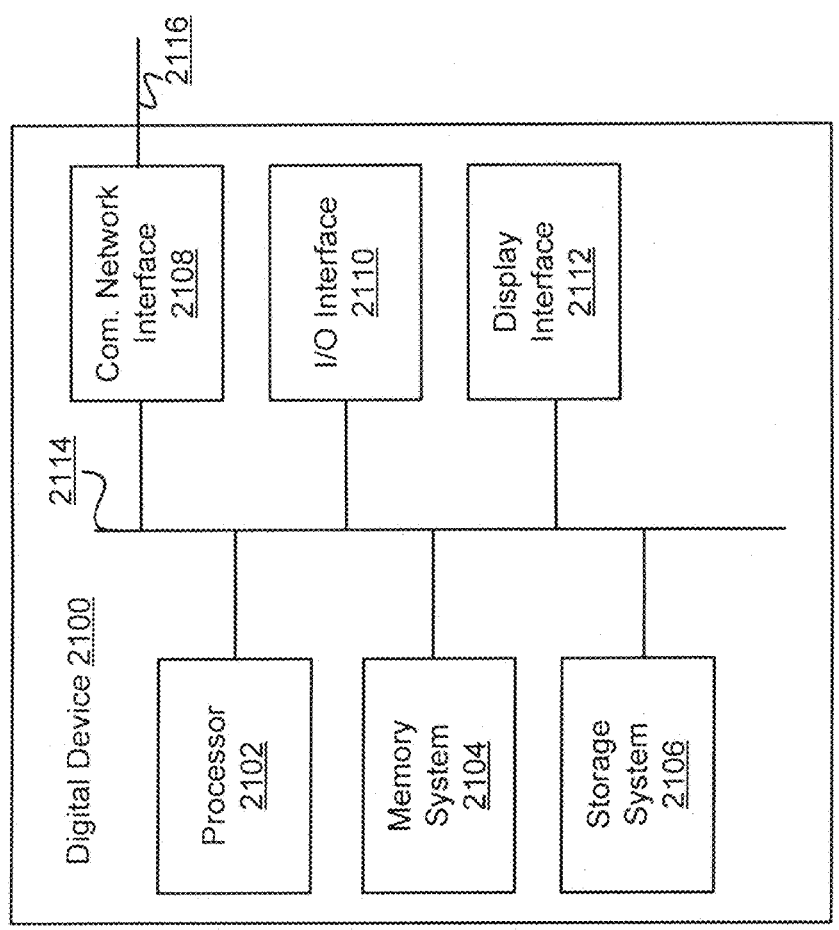
FIG. 21 is an exemplary digital device in some embodiments.

FIG. 21 is a block diagram of an exemplary digital device 2100. The digital device 2100 comprises a processor 2102, a memory system 2104, a storage system 2106, a communication network interface 2108, an I/O interface 2110, and a display interface 2112 communicatively coupled to a bus 2114. The processor 2102 is configured to execute executable instructions (e.g., programs). In some embodiments, the processor 2102 comprises circuitry or any processor capable of processing the executable instructions.

The memory system 2104 is any memory configured to store data. Some examples of the memory system 2104 are storage devices, such as RAM or ROM. The memory system 2104 can comprise the ram cache. In various embodiments, data is stored within the memory system 2104. The data within the memory system 2104 may be cleared or ultimately transferred to the storage system 2106.

The storage system 2106 is any storage configured to retrieve and store data. Some examples of the storage system 2106 are flash drives, hard drives, optical drives, and/or magnetic tape. In some embodiments, the digital device 2100 includes a memory system 2104 in the form of RAM and a storage system 2106 in the form of flash data. Both the memory system 2104 and the storage system 2106 comprise computer readable media which may store instructions or programs that are executable by a computer processor including the processor 2102.

The communication network interface (com. network interface) 2108 can be coupled to a network (e.g., communication network 108) via the link 2116. The communication network interface 2108 may support communication over an Ethernet connection, a serial connection, a parallel connection, or an ATA connection, for example. The communication network interface 2108 may also support wireless communication (e.g., 802.11a/b/g/n, WiMax). It will be apparent to those skilled in the art that the communication network interface 2108 can support many wired and wireless standards.

The optional input/output (I/O) interface 2110 is any device that receives input from the user and output data. The optional display interface 2112 is any device that is configured to output graphics and data to a display. In one example, the display interface 2112 is a graphics adapter. It will be appreciated that not all digital devices 2100 comprise either the I/O interface 2110 or the display interface 2112.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A system comprising:
   a processor;
   memory;
   a presentation manager configured to control the processor to receive first information regarding a pending agreement from a digital device, at least a portion of the presentation manager being in the memory;
   a business object manager configured to control the processor to instantiate a first business object based on the received first information and to store the first business object within a data structure residing in a computer readable medium;
   a metadata manager configured to control the processor to retrieve first metadata associated with the first business object; and
   a business rule manager configured to control the processor to identify and retrieve a first business rule from a plurality of business rules based on the first metadata, the first business rule comprising instructions to perform an operation that is conditional on the first business object, the business rule manager further configured to control the processor to:
     determine whether a first condition is satisfied by the first business object,
     determine a status of the pending agreement based on the determination whether the first condition is satisfied, and
     instruct the presentation manager to provide the status of the pending agreement to the digital device.

2. The system of claim 1, wherein the business rule manager is further configured to control the processor to determine whether additional information is required based on the first business rule, and the presentation manager is further configured to control the processor to provide a request for additional information based on a determination by the business rule manager that the additional information is required.

3. The system of claim 2, wherein the business object manager is further configured to control the processor to instantiate a second business object based on received second information associated with the request for the additional information, the metadata manager is further configured to control the processor to retrieve second metadata associated with the second business object, and the business rule manager is further configured to control the processor to determine whether a second condition is satisfied by the second business object based on a second business rule of the plurality of business rules.

4. The system of claim 3, wherein if the second condition is satisfied, the business rule manager is further configured to control the processor to determine whether third information is required based on the second business rule.

5. The system of claim 4, wherein the business rule manager is further configured to control the processor to redetermine the status of the pending agreement based on the determination whether the first condition is satisfied and the determination whether the second condition is satisfied.

6. The system of claim 4, wherein the business rule manager is further configured to control the processor to redetermine the status of the pending agreement based on the determination whether the second condition is satisfied.

7. The system of claim 6, wherein the presentation manager is further configured to control the processor to provide an updated status of the pending agreement based on the redetermination.

8. The system of claim 1, wherein the metadata manager is further configured to control the processor to contact a second digital device to request approval of the pending agreement.

9. The system of claim 1, wherein the status of the pending agreement indicates if the pending agreement is denied, accepted, or pending.

10. The system of claim 1, wherein the presentation manager is further configured to control the processor to receive first pending agreement information to create a report regarding the pending agreement.

11. The system of claim 10, wherein the business object manager is further configured to control the processor to query the data structure based on the received first pending agreement information and retrieve second pending agreement information to create the report.

12. The system of claim 11, wherein the business rule manager is further configured to control the processor to direct the presentation manager to display the report.

13. The system of claim 12, wherein the report depicts a summary of the status of the pending agreement and at least a portion of other reports that were retrieved as a result of the query by the business object manager.

14. The system of claim 11, wherein the business object manager further configured to control the processor to query the data structure comprises the business object manager configured to control the processor to find a particular business object using a conditional query and to query contents of the found particular business object.

15. The system of claim 1, wherein the data structure is a relational database.

16. A method comprising:
   receiving first information regarding a pending agreement from a digital device;
   instantiating a first business object based on the received first information;
   storing the first business object within a data structure residing in a computer readable medium;
   retrieving first metadata associated with the first business object;
   identifying and retrieving a first business rule from a plurality of business rules based on the first metadata, the first business rule comprising instructions to perform an operation that is conditional based on the first business object;
   determining whether a first condition is satisfied by the first business object;

determining a status of the pending agreement based on the determination whether the first condition is satisfied; and providing the status of the pending agreement to the digital device.

17. The method of claim 16, further comprising:

if the first condition is satisfied, determining whether additional information is required based on the first business rule;

providing a request for the additional information;

receiving second information associated with the request for the additional information;

instantiating a second business object based on the received second information;

retrieving second metadata associated with the second business object;

identifying and retrieving a second business rule from the plurality of business rules based on the second metadata;

determining whether a second condition is satisfied by the second business object based on the second business rule;

determining an updated status of the pending agreement based on the determination whether the first condition is satisfied and the determination whether the second condition is satisfied; and providing the updated status of the pending agreement to the digital device.

18. The method of claim 17, wherein determining the updated status of the pending agreement based on the determination whether the first condition is satisfied and the determination whether the second condition is satisfied comprises redetermining the status of the pending agreement.

19. The method of claim 16, wherein the status of the pending agreement indicates if the pending agreement is denied, accepted, or pending.

20. A non-transitory computer readable medium comprising executable instructions, the executable instructions being executable by a processor to perform a method, the method comprising:

receiving first information regarding a pending agreement from a digital device;

instantiating a first business object based on the received first information;

storing the first business object within a data structure residing in a computer readable medium;

retrieving first metadata associated with the first business object;

identifying and retrieving a first business rule from a plurality of business rules based on the first metadata, the first business rule comprising instructions to perform an operation that is conditional based on the first business object;

determining whether a first condition is satisfied by the first business object;

determining a status of the pending agreement based on the determination whether the first condition is satisfied; and providing the status of the pending agreement to the digital device.

21. The non-transitory computer readable medium of claim 20, wherein the method further comprises determining whether additional information is required based on the first business rule and providing a request for additional information based on a determination that the additional information is required.

22. The non-transitory computer readable medium of claim 21, wherein the method further comprises:

instantiating a second business object based on received second information associated with the request for the additional information;

retrieving second metadata associated with the second business object; and determining whether a second condition is satisfied by the second business object based on a second business rule of the plurality of business rules.

23. The non-transitory computer readable medium of claim 22, wherein the method further comprises, if the second condition is satisfied, determining whether third information is required based on the second business rule.

24. The non-transitory computer readable medium of claim 23, wherein the method further comprises redetermining the status of the pending agreement based on the determination whether the first condition is satisfied and the determination whether the second condition is satisfied.

25. The non-transitory computer readable medium of claim 23, wherein the method further comprises redetermining the status of the pending agreement based on the determination whether the second condition is satisfied.

26. The non-transitory computer readable medium of claim 25, wherein the method further comprises providing an updated status of the pending agreement based on the redetermination.

27. The non-transitory computer readable medium of claim 20, wherein the method further comprises contacting a second digital device to request approval of the pending agreement.

28. The non-transitory computer readable medium of claim 20, wherein the status of the pending agreement indicates if the pending agreement is denied, accepted, or pending.

29. The non-transitory computer readable medium of claim 20, wherein the method further comprises receiving first pending agreement information to create a report regarding the pending agreement.

30. The non-transitory computer readable medium of claim 29, wherein the method further comprises querying the data structure based on the received first pending agreement information and retrieving second pending agreement information to create the report.

31. The non-transitory computer readable medium of claim 30, wherein the method further comprises displaying the report.

32. The non-transitory computer readable medium of claim 31, wherein the report depicts a summary of the status of the pending agreement and at least a portion of other reports that were retrieved as a result of the query.

* * * * *